United States Patent
Bao et al.

(10) Patent No.: US 12,047,823 B2
(45) Date of Patent: Jul. 23, 2024

(54) CROSS-CARRIER SCHEDULING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 17/374,659

(22) Filed: Jul. 13, 2021

(65) Prior Publication Data

US 2022/0022107 A1 Jan. 20, 2022

Related U.S. Application Data

(60) Provisional application No. 63/051,866, filed on Jul. 14, 2020.

(51) Int. Cl.
*H04W 36/00* (2009.01)
*H04W 52/02* (2009.01)
*H04W 72/23* (2023.01)
*H04W 76/28* (2018.01)

(52) U.S. Cl.
CPC ... *H04W 36/0072* (2013.01); *H04W 52/0235* (2013.01); *H04W 72/23* (2023.01); *H04W 76/28* (2018.02)

(58) Field of Classification Search
CPC ......... H04W 36/0072; H04W 52/0235; H04W 72/042; H04W 76/28; H04W 76/15; H04W 52/0206; H04W 72/23; Y02D 30/70; H04L 5/0035
See application file for complete search history.

(56) References Cited

U.S. PATENT DOCUMENTS

| | | | |
|---|---|---|---|
| 2021/0050987 A1* | 2/2021 | Hsieh | H04W 72/0453 |
| 2021/0105722 A1* | 4/2021 | Tsai | H04W 52/0235 |
| 2021/0250156 A1* | 8/2021 | Kim | H04W 72/0453 |
| 2021/0329677 A1* | 10/2021 | Huang | H04W 24/08 |
| 2022/0256462 A1* | 8/2022 | Li | H04W 76/15 |
| 2022/0330156 A1* | 10/2022 | Zhou | H04W 72/042 |

(Continued)

OTHER PUBLICATIONS

3GPP TSG RAN WG1 #99; R1-1912055, Source: vivo; Title: Fast Scell activation and dormancy like behavior, Reno, USA, Nov. 18-22, 2019 (Year: 2019).*

(Continued)

*Primary Examiner* — Mohammed S Chowdhury
(74) *Attorney, Agent, or Firm* — MG-IP Law, P.C.

(57) ABSTRACT

When a user equipment (UE) is configured with a primary cell (PCell) and one or more secondary cells (SCell), scheduling of uplink (UL) and/or downlink (DL) resources for the UE may be received from the primary cell. However, in some circumstances, the primary cell may be unable to provide such scheduling related information. In such circumstances, one or more secondary cells may be enabled to provide scheduling related information to the UE such that cells other than the primary cell may function as scheduling cells. Information regarding dormancy states of the cells (primary and/or secondary) may also be provided by the scheduling cells.

30 Claims, 20 Drawing Sheets

(56) References Cited

U.S. PATENT DOCUMENTS

2022/0353773 A1* 11/2022 Malhotra .............. H04W 36/08
2023/0209651 A1*  6/2023 Okamura .............. H04W 76/15
                                                      370/329

OTHER PUBLICATIONS

3GPP TSG RAN WG1 Meeting #99; R1-1911972; Source: ZTE Corporation; Title: Discussion on low latency SCell activation; Reno, USA, Nov. 18-22, 2019. (Year: 2019).*

3GPP TSG RAN WG1 #99; R1-1912497; Source: Samsung; Title: On SCell Activation and Dormant Cells; Reno, USA, Nov. 18-22, 2019 (Year: 2019).*

3GPP TSG RAN WG1 #99; R1-1911875; Source: Huawei, HiSilicon; Title: Discussion on low latency SCell activation and efficient SCell management; Reno, USA, Nov. 18-22, 2019 (Year: 2019).*

3GPP TSG RAN Meeting #84; RP-191052; Title: Dynamic spectrum sharing in Rel-17; Source: Ericsson; Newport Beach, CA, USA Jun. 3-6, 2019; (Year: 2019).*

3GPP TSG RAN WG1#102-e; R1-2006749; Source: NTT Docomo, Inc. ; Source: NTT Docomo, Inc.; Title: Discussion on cross-carrier scheduling enhancements for NR DSS; e-Meeting, Aug. 17-28, 2020. (Year: 2020).*

3GPP TSG-RAN WG1 #102-e; R1-2006671; Source: Ericsson; Title: Enhanced cross-carrier scheduling for DSS; eMeeting, Aug. 17-28, 2020. (Year: 2020).*

3GPP TSG RAN WG1 #102-e; R1-2005409; Source: vivo; Title: Discussion on Scell scheduling P(S)cell; e-Meeting, Aug. 17-28, 2020 (Year: 2020).*

* cited by examiner

CROSS-CARRIER SCHEDULING

CROSS-REFERENCE TO RELATED APPLICATION

The present Application for Patent claims the benefit of U.S. Provisional Patent Application No. 63/051,866 entitled "CROSS-CARRIER SCHEDULING," filed Jul. 14, 2020, assigned to the assignee hereof, and expressly incorporated herein by reference in its entirety.

FIELD OF DISCLOSURE

Aspects of the disclosure relate generally to wireless communications, and more particularly to cross-carrier scheduling. Certain embodiments of the technology discussed below can enable handing over or otherwise switching of scheduling with physical downlink control channel (PDCCH) between network nodes (e.g., base stations, cells, access points, transmission-reception points (TRP), etc.) of a network.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

An aspect may be directed to method of a first network node. The method may comprise sending, by the first network node, a scheduling switch notification to a user equipment (UE). The scheduling switch notification may indicate that provision of scheduling information for the UE will switch from the first network node to one or more next network nodes in a cell group. The method may comprise switching, by the first network node, the provision of the scheduling information for the UE from the first network node to the one or more next network nodes. The UE may be in connection with the first network node and one or more second network nodes simultaneously. The one or more next network nodes may comprise the first network node, at least one second network node, or both. The scheduling information may comprise information on communication resources scheduled for the UE to communicate with the first network node, the one or more second network nodes, or both. The communication resources may comprise uplink (UL) resources, downlink (DL) resources, or both.

An aspect may be directed to a first network node. The first network node may comprise a memory, at least one transceiver, and at least one processor communicatively coupled to the memory and the at least one transceiver. The at least one processor may be configured to send a scheduling switch notification to a user equipment (UE). The scheduling switch notification may indicate that provision of scheduling information for the UE will switch from the first network node to one or more next network nodes in a cell group. The at least one processor may also be configured to switch the provision of the scheduling information for the UE from the first network node to the one or more next network nodes. The UE may be in connection with the first network node and one or more second network nodes simultaneously. The one or more next network nodes may comprise the first network node, at least one second network node, or both. The scheduling information may comprise information on communication resources scheduled for the UE to communicate with the first network node, the one or more second network nodes, or both. The communication resources may comprise uplink (UL) resources, downlink (DL) resources, or both.

Another aspect may be directed to a first network node. The first network node may comprise means for sending a scheduling switch notification to a user equipment (UE). The scheduling switch notification may indicate that provision of scheduling information for the UE will switch from the first network node to one or more next network nodes in a cell group. The first network node may also comprise means for switching the provision of the scheduling information for the UE from the first network node to the one or more next network nodes. The UE may be in connection with the first network node and one or more second network nodes simultaneously. The one or more next network nodes may comprise the first network node, at least one second network node, or both. The scheduling information may comprise information on communication resources scheduled for the UE to communicate with the first network node, the one or more second network nodes, or both. The communication resources may comprise uplink (UL) resources, downlink (DL) resources, or both.

An aspect may be directed to a non-transitory computer-readable medium comprising instructions for a first network node comprising a memory, at least one transceiver, and at least one processor communicatively coupled to the memory and the at least one transceiver. The instructions may cause the at least one processor to send a scheduling switch notification to a user equipment (UE). The scheduling switch notification may indicate that provision of scheduling information for the UE will switch from the first network node to one or more next network nodes in a cell group. The instructions may also cause the at least one processor to switch the provision of the scheduling information for the UE from the first network node to the one or more next network nodes. The UE may be in connection with the first network node and one or more second network nodes simultaneously. The one or more next network nodes may comprise the first network node, at least one second network node, or both. The scheduling information may comprise information on communication resources scheduled for the UE to communicate with the first network node, the one or more second network nodes, or both. The communication resources may comprise uplink (UL) resources, downlink (DL) resources, or both.

An aspect may be directed to method of a user equipment (UE). The method may comprise receiving, at the UE, a scheduling switch notification from a first network node. The scheduling switch notification may indicate that provision of scheduling information for the UE will switch from the first network node to one or more next network nodes in a cell group. The method may also comprise switching, by the UE, to monitor the one or more next scheduling network nodes for the scheduling information in accordance with the scheduling switch notification. The UE may be in connection with the first network node and one or more second network nodes simultaneously. The one or more next network nodes may comprise the first network node, at least one second network node, or both. The scheduling information may comprise information on communication resources scheduled for the UE to communicate with the first network node, the one or more second network nodes, or both. The communication resources may comprise uplink (UL) resources, downlink (DL) resources, or both.

An aspect may be directed to a user equipment (UE). The UE may comprise a memory, at least one transceiver, and at least one processor communicatively coupled to the memory and the at least one transceiver. The at least one processor may be configured to receive a scheduling switch notification from a first network node. The scheduling switch notification may indicate that provision of scheduling information for the UE will switch from the first network node to one or more next network nodes in a cell group. The at least one processor may also be configured to switch to monitor the one or more next scheduling network nodes for the scheduling information in accordance with the scheduling switch notification. The UE may be in connection with the first network node and one or more second network nodes simultaneously. The one or more next network nodes may comprise the first network node, at least one second network node, or both. The scheduling information may comprise information on communication resources scheduled for the UE to communicate with the first network node, the one or more second network nodes, or both. The communication resources may comprise uplink (UL) resources, downlink (DL) resources, or both.

Another aspect may be directed to user equipment (UE). The UE may comprise means for receiving a scheduling switch notification from a first network node. The scheduling switch notification may indicate that provision of scheduling information for the UE will switch from the first network node to one or more next network nodes in a cell group. The UE may also comprise means for switching to monitor the one or more next scheduling network nodes for the scheduling information in accordance with the scheduling switch notification. The UE may be in connection with the first network node and one or more second network nodes simultaneously. The one or more next network nodes may comprise the first network node, at least one second network node, or both. The scheduling information may comprise information on communication resources scheduled for the UE to communicate with the first network node, the one or more second network nodes, or both. The communication resources may comprise uplink (UL) resources, downlink (DL) resources, or both.

An aspect may be directed to a non-transitory computer-readable medium comprising instructions for a user equipment (UE) comprising a memory, at least one transceiver, and at least one processor communicatively coupled to the memory and the at least one transceiver. The instructions may cause the at least one processor to receive a scheduling switch notification from a first network node. The scheduling switch notification may indicate that provision of scheduling information for the UE will switch from the first network node to one or more next network nodes in a cell group. The instructions may also cause the at least one processor to switch to monitor the one or more next scheduling network nodes for the scheduling information in accordance with the scheduling switch notification. The UE may be in connection with the first network node and one or more second network nodes simultaneously. The one or more next network nodes may comprise the first network node, at least one second network node, or both. The scheduling information may comprise information on communication resources scheduled for the UE to communicate with the first network node, the one or more second network nodes, or both. The communication resources may comprise uplink (UL) resources, downlink (DL) resources, or both.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure.

DETAILED DESCRIPTION

Figure 1:
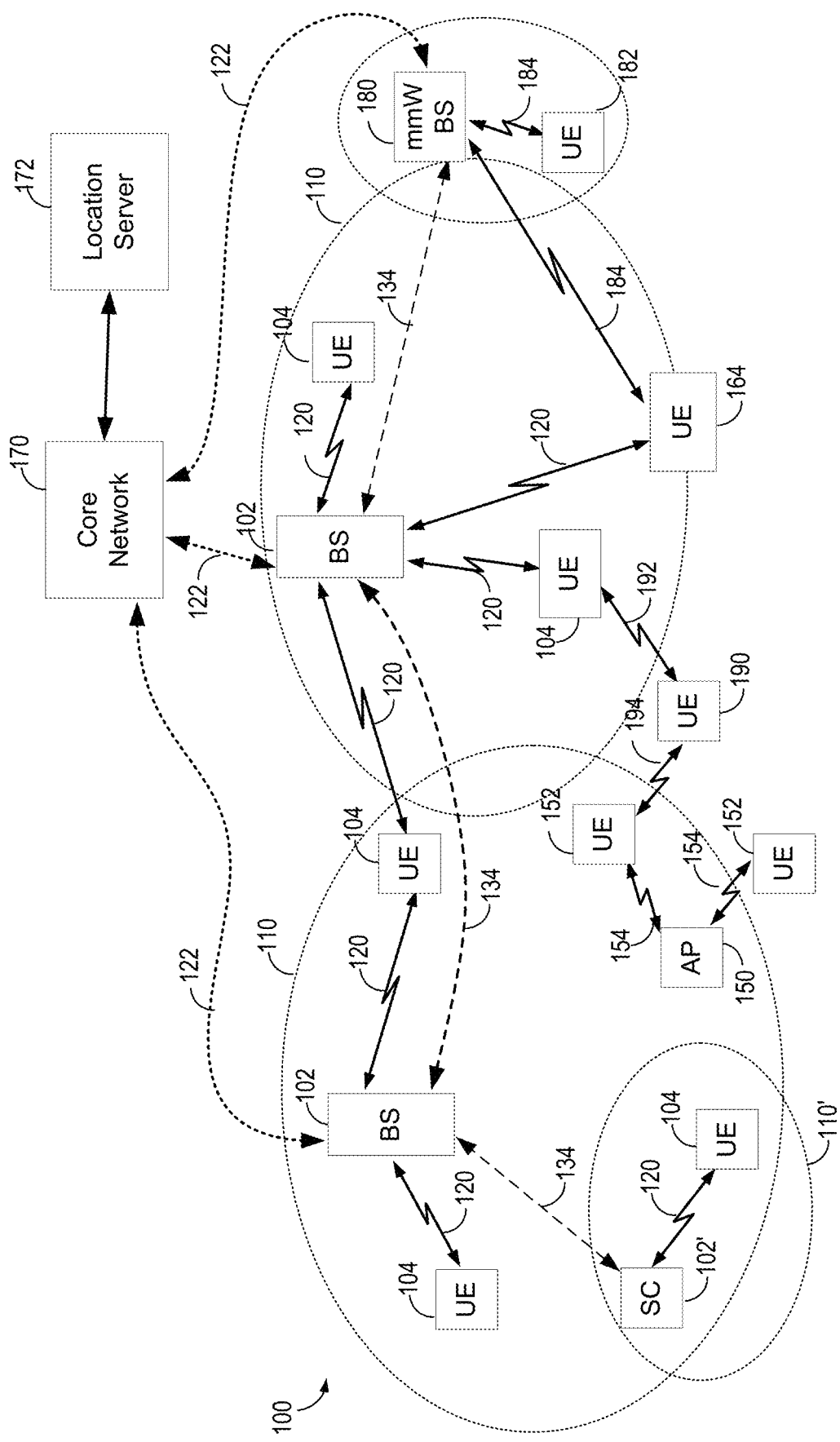
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), and the like. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s).

To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 MHz to 6 GHz), FR2 (from 24.25 to 52.6 GHz), FR3 (above 52.6 GHz), and FR4 (between FR1 and FR2). In a multi-carrier system, such as 5G, one of the carrier frequencies may be referred to as the "primary carrier" or "anchor carrier" or "primary serving cell" or "PCell," and the remaining carrier frequencies may be referred to as "secondary carriers" or "secondary serving cells" or "SCells." In carrier aggregation, the anchor carrier may be the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure.

The primary carrier can carry all common and UE-specific control channels, and may be a carrier in a licensed frequency (however, this is not always the case). A secondary carrier can be a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
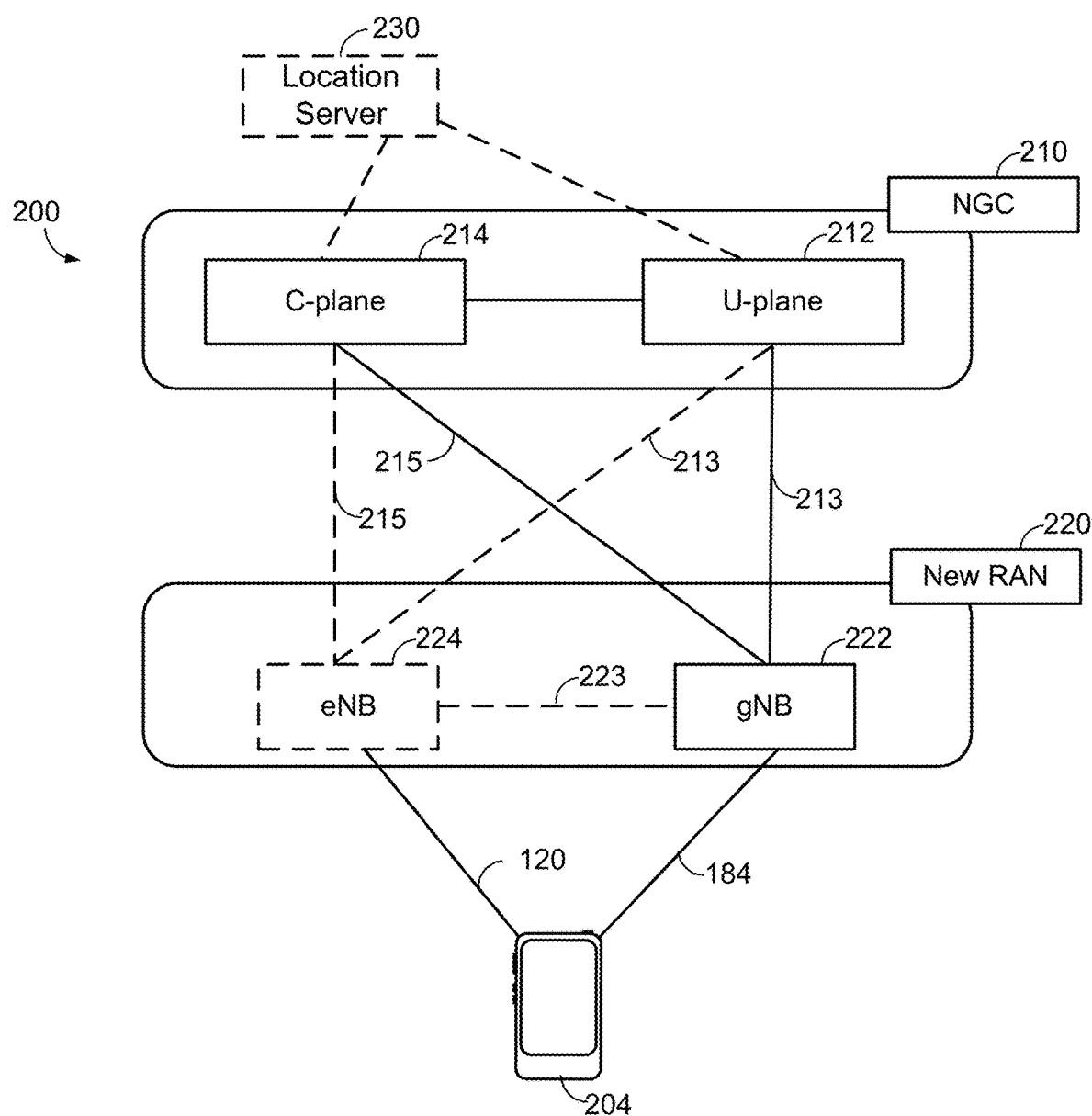
FIGS. 2A and 2B illustrate example wireless network structures, according to various aspects.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212.

In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1).

Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
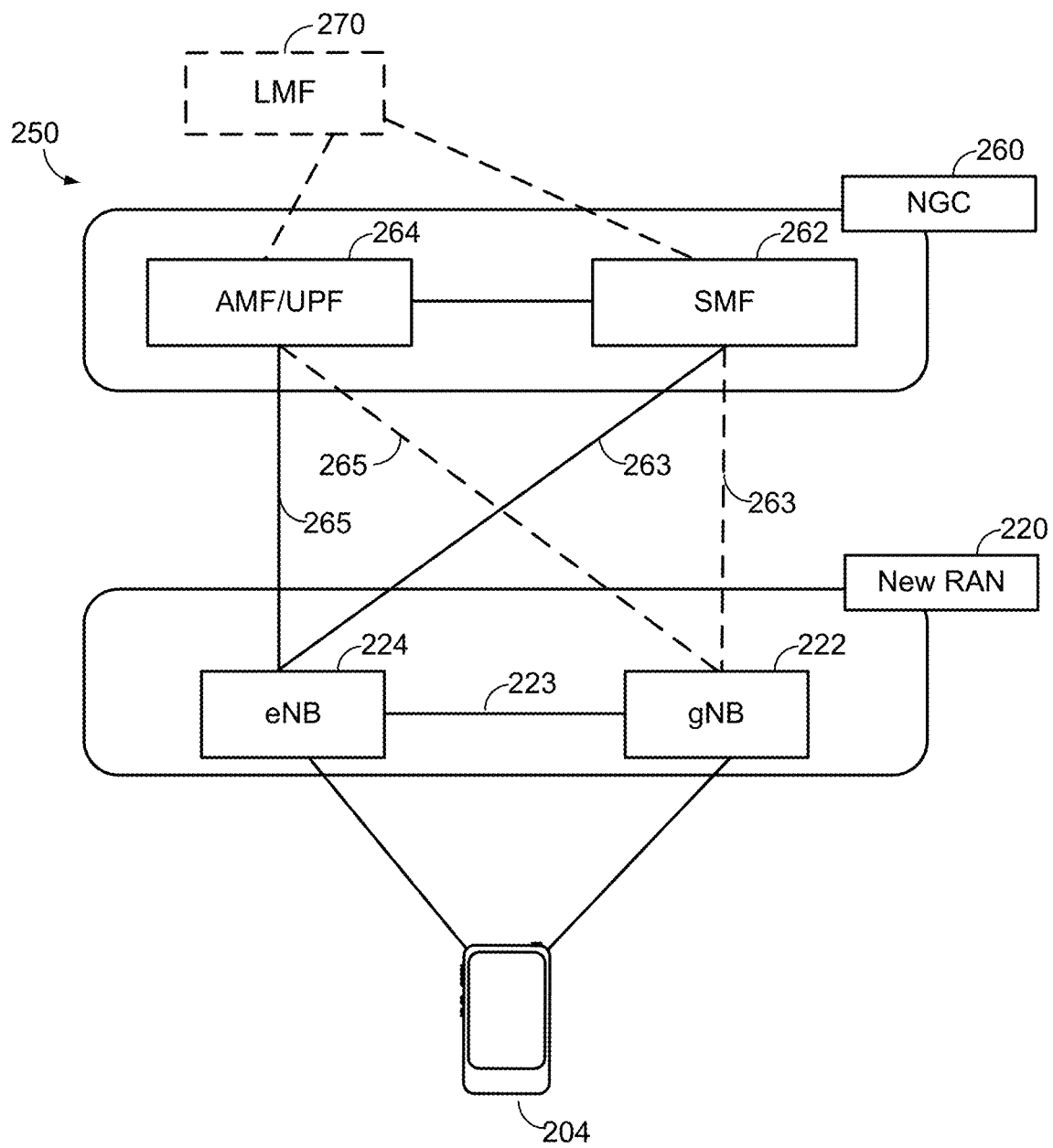

FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively.

In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 may communicate with the AMF-side of the AMF/UPF 264 over the N2 interface (not shown) and the UPF-side of the AMF/UPF 264 over the N3 interface (not shown).

The functions of the AMF 264 may include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF) (not shown).

The AMF 264 may also interact with the authentication server function (AUSF) (not shown) and the UE 204, and receive the intermediate key that was established as a result of the UE 204 authentication process. In the case of authentication based on a UMTS (universal mobile telecommunications system) subscriber identity module (USIM), the AMF 264 may retrieve the security material from the AUSF.

The functions of the AMF 264 may also include security context management (SCM) (not shown). The SCM may receive a key from the SEAF that it uses to derive access-network specific keys. The functionality of the AMF 264 may further include location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF 264 may also support functionalities for non-3GPP access networks.

Functions of the UPF 264 may include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 may include session management, UE Internet protocol (IP) address allocation and management, selection and control of user plane functions, configuration of traffic steering at the UPF 264 to route traffic to the proper destination, control of part of policy enforcement and QoS, and downlink data notification. The interface over which the SMF 262 communicates with the AMF-side of the AMF/UPF 264 is referred to as the N11 interface (not shown).

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
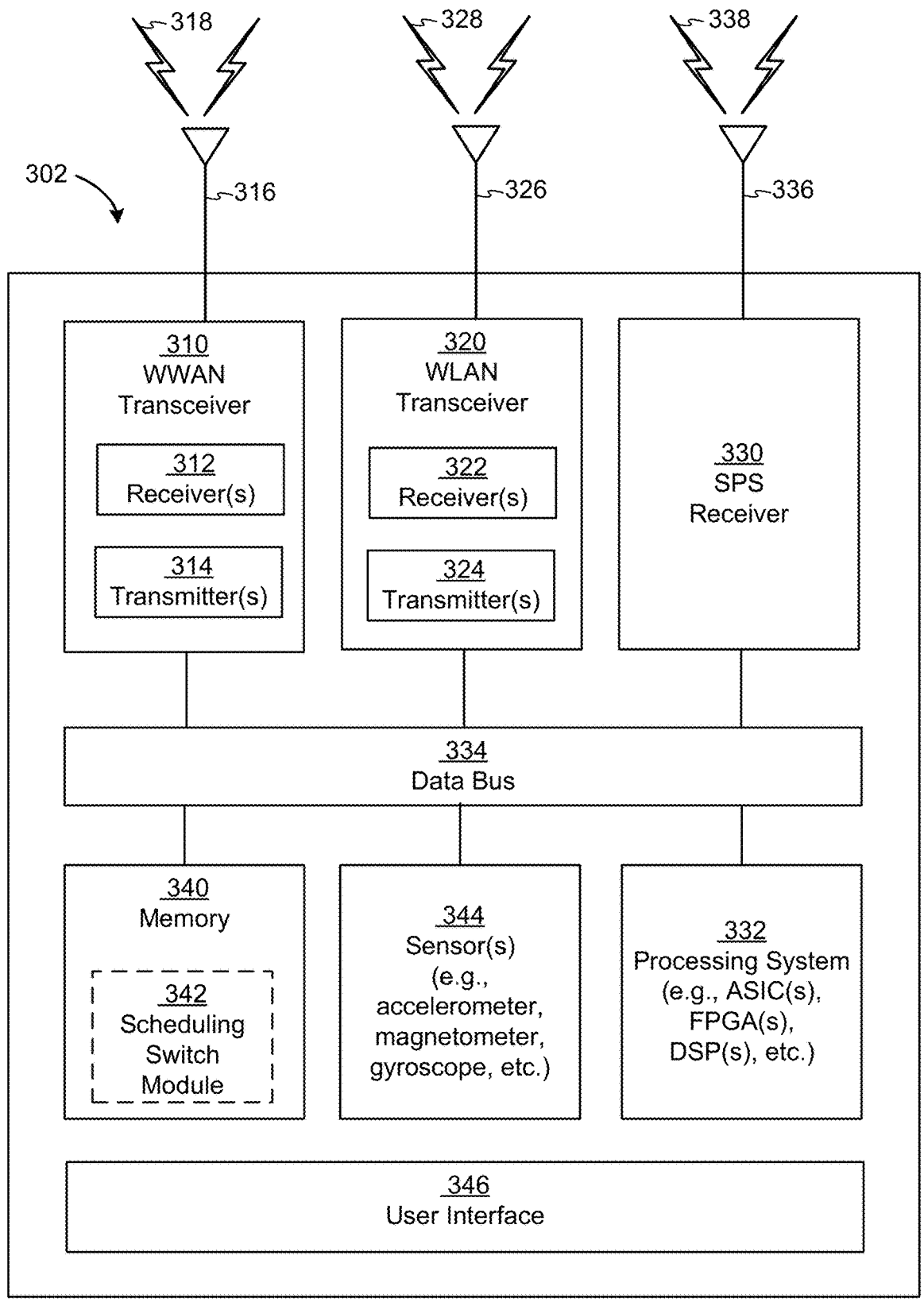
FIGS. 3A to 3C are simplified block diagrams of several sample aspects of components that may be employed in wireless communication nodes and configured to support communication as taught herein.
Figure 3B:
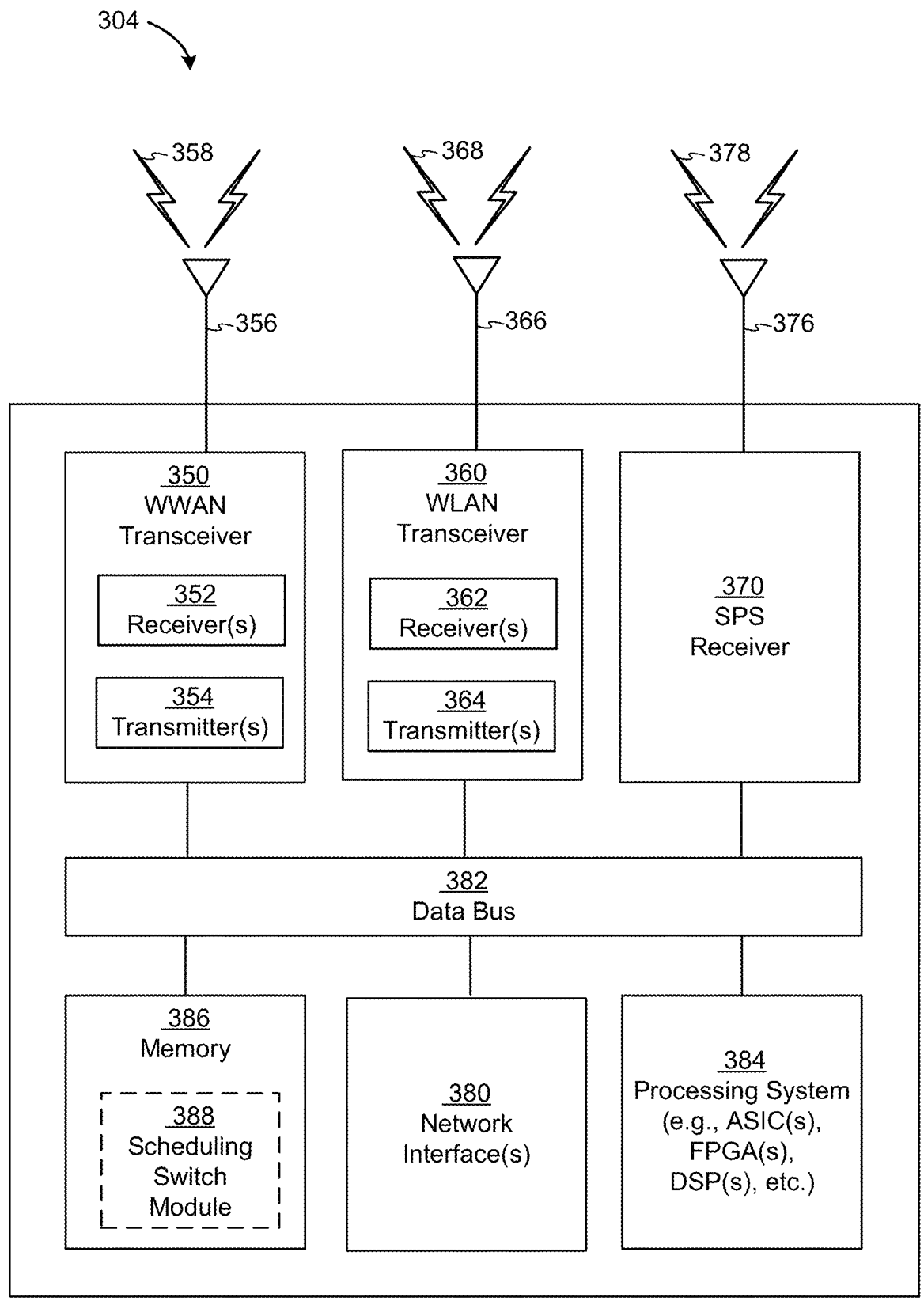
Figure 3C:
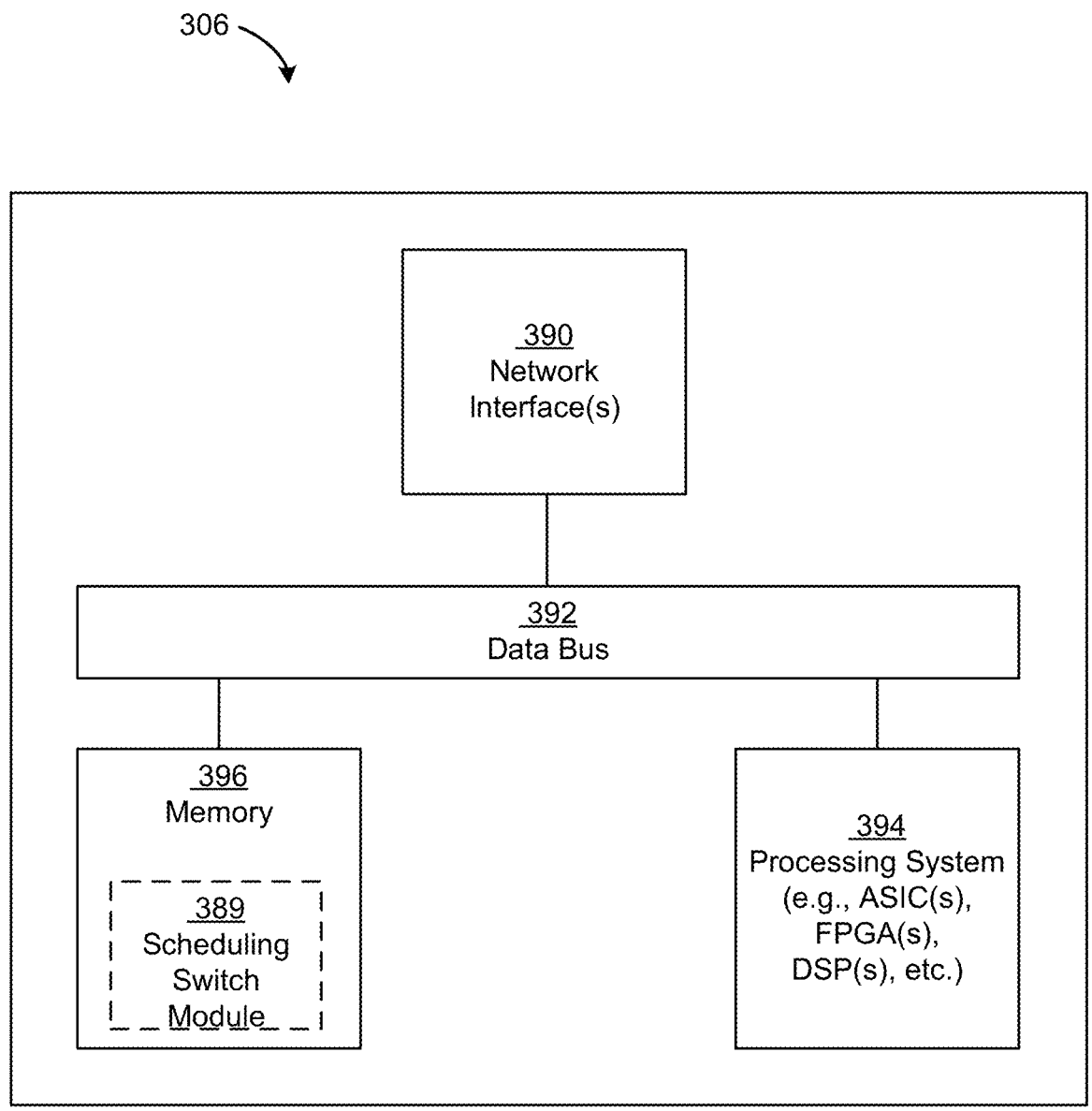

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein) to support operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 may each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 may include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 may include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 may include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 may include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), and the like. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 may each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 may include other components that can be used in conjunction with the operations as disclosed herein. The UE 302 may include processor circuitry implementing a processing system 332 for providing other processing functionalities. The base station 304 may include a processing system 384 for providing processing functionalities. The network entity 306 may include a processing system 394 for providing processing functionalities. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 may include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304 and/or 306 may include scheduling switch modules 342, 388 and 389, respectively. The scheduling switch modules 342, 388 and 389 may each comprise a hardware circuit that is part of or coupled to the processing system 332, that, when executed, causes the apparatuses 302, 304 and/or 306 to perform the functionality described herein. Alternatively, the scheduling switch modules 342, 388 and 389 may be memory modules (as shown in FIGS. 3A-3C) stored in the memory components 340, 386 and 396, respectively, that, when executed by the processing systems 332, 384 and 394, respectively, cause the apparatuses 302, 304 and/or 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 may include a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 may receive a signal through its respective antenna(s) 316. The receiver 312 may recover information modulated onto an RF carrier and provide the information to the processing system 332. The transmitter 314 and the receiver 312 may implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 may then convert the OFDM symbol stream from the time-domain to the frequency domain using a fast Fourier transform (FFT). The frequency domain signal may comprise a separate OFDM symbol stream for each subcarrier of the OFDM signal. The symbols on each subcarrier, and the reference signal, may be recovered and demodulated by determining the most likely signal constellation points transmitted by the base station 304. These soft decisions may be based on channel estimates computed by a channel estimator. The soft decisions may then be decoded and de-interleaved to recover the data and control signals that were originally transmitted by the base station 304 on the physical channel. The data and control signals may be provided to the processing system 332, which may implement Layer-3 and Layer-2 functionalities.

In the UL, the processing system 332 may provide demultiplexing between transport and logical channels, packet reassembly, deciphering, header decompression, and control signal processing to recover IP packets from the core network. The processing system 332 may also be responsible for error detection.

Similar to the functionality described in connection with the DL transmission by the base station 304, the processing system 332 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

The UL transmission may be processed at the base station 304 in a manner similar to that described in connection with the receiver function at the UE 302. The receiver 352 may receive a signal through its respective antenna(s) 356. The receiver 352 may recover information modulated onto an RF carrier and provide the information to the processing system 384.

In the UL, the processing system 384 may provide demultiplexing between transport and logical channels, packet reassembly, deciphering, header decompression, control signal processing to recover IP packets from the UE 302. IP packets from the processing system 384 may be provided to the core network. The processing system 384 may also be responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components).

Similarly, some or all of the functionality represented by blocks 350 to 384 may be implemented by processor and memory component(s) of the base station 304 (e.g., by execution of appropriate code and/or by appropriate configuration of processor components). Also, some or all of the functionality represented by blocks 390 to 396 may be implemented by processor and memory component(s) of the network entity 306 (e.g., by execution of appropriate code and/or by appropriate configuration of processor components).

For simplicity, various operations, acts, and/or functions are described herein as being performed "by a UE", "by a base station", "by a network entity", "by a network node" and the like. However, as will be appreciated, such operations, acts, and/or functions may actually be performed by specific components or combinations of components of the UE, base station, network entity, etc., such as the processing systems 332, 384, 394, the transceivers 310, 320, 350, and 360, the memory components 340, 386, and 396, the scheduling switch modules 342, 388 and/or 389, etc.

Cross-carrier scheduling may be generally described as scheduling or allocating of DL and/or UL resources (e.g., physical downlink shared channel (PDSCH), physical uplink shared channel (PUSCH)) of a carrier that is not necessarily linked to the carrier of the DL control channel (e.g., physical downlink control channel (PDCCH)) in which the scheduling information is carried. That is, a first network node (e.g., cell, transmission point, base station, etc.) may transmit on a first DL control channel scheduling information of DL and/or UL channel resources of one or more second network nodes. Of course, the first network node may also transmit on the first DL control channel scheduling information of DL and/or UL channel resources of itself.

In the context of primary and secondary cells (PCells, SCells), it can be that the PDCCH of a cell, e.g., primary cell, can carry scheduling information of PDSCH and/or PUSCH of primary and secondary cells. Note that terms "PCell" and "primary cell" may be used interchangeably. Also, terms "SCell" and "secondary cell" may be used interchangeably. To receive the scheduling information, the UE can monitor the PDCCH from the primary cell. More broadly, the UE may monitor the first DL control channel associated with the first network node.

However, actively monitoring the PDCCH can cause significant power consumption in the UE. One reason for such power consumption is that the downlink control information (DCI) carrying the scheduling information is blindly decoded. As an energy saving technique, the UE may be configured to operate in a discontinuous reception (DRX) mode in which the UE does not continuously monitor the PDCCH during a DRX cycle. For example, one DRX cycle may be of a certain time length (e.g., 160 ms). The UE may wake up to monitor the PDCCH for scheduling messages (e.g., for DCI), during a well-defined monitoring interval (e.g., 10 ms on-duration) within the DRX cycle. If there is nothing scheduled for the UE, the UE can go into a sleep (or inactive) mode for the remainder (e.g., 150 ms off-duration) of the DRX cycle.

Note that without wakeup signal (WUS) protocol (discussed immediately below), the UE monitors the PDCCH of the primary cell even though no resources may be scheduled for the UE. And as indicated, monitoring the PDCCH itself consumes power. To further save energy, the UE may be told ahead of time whether it actually needs to monitor the PDCCH. In this regard, the primary cell can send a WUS, e.g., a single bit, during off-duration of a DRX cycle to indicate whether the UE needs to wakeup on upcoming DRX on-duration to monitor the PDCCH. If the wakeup indication indicates that the UE does not need to monitor the PDCCH, then the UE need not wakeup for the upcoming DRX on-duration. Although the UE needs to wakeup to monitor the whether a WUS is received (or a "WUS occasion"), since the WUS occasion is of shorter duration than the DRX on-duration, there can be energy saving benefits.

When secondary cells are activated for a UE, the UE is expected to perform channel state information (CSI) measurements and measurements for automatic gain control (AGC) and beam management as well as to monitor the control channels (e.g., PDCCH) if the UE is so configured. But again, monitoring the secondary cells, and monitoring the PDCCH of the secondary cells in particular, consumes energy at the UE. For ease of reference, measurements performed by the UE on activated secondary cells (CSI measurements, measurements for AGC and beam management) will be referred to as expected measurements.

To enable energy savings in this regard, a "dormancy" behavior is defined in NR in which the UE, if configured, continues to make the expected measurements. However, the UE may not need to monitor the PDCCH of dormant secondary cells. If data is to be scheduled for the UE on a dormant secondary cell, the cell can be brought out of dormancy. L1 based SCell dormancy indication can be sent by the primary cell. An explicit information field in DCI can indicate switching to/from dormant bandwidth part (BWP) configured for the secondary cell.

In this regard, there can be for each cell (primary or secondary), a "dormant" BWP and one or more "non-dormant" BWPs. Recall that if a secondary cell is dormant, then the UE may monitor the secondary cell to make the expected measurements. Thus, a dormant BWP of a cell may be the BWP associated the expected measurements. However, if the cell is not dormant, then in addition to monitoring the cell for the expected measurements, the UE also monitors the PDCCH of the cell.

Whether or not a particular secondary cell or secondary cell group (e.g., SCell group) is dormant can be indicated to the UE by the primary cell. That is, SCell dormancy indication can be provided to the UE within the DRX active time (i.e., within DRX on-duration) and/or outside the DRX active time of the UE. Within the DRX active time, an explicit information field in a non-fallback DCI (e.g., DCI 0_1, or 1_1) can be used. Outside the DRX active time, a wakeup signal (WUS) occasion can be used. A same BWP framework can be used for within and outside the DRX active time.

Figure 4A:
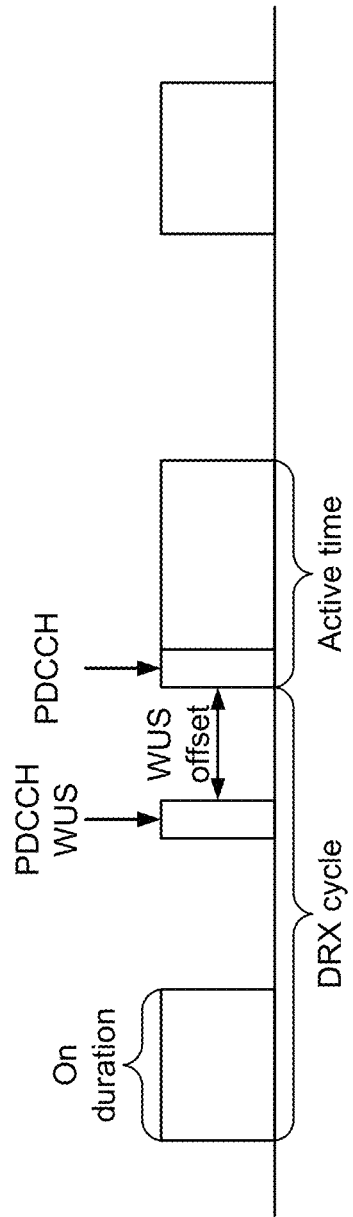
FIGS. 4A-4B illustrate an example discontinuous reception (DRX) time for a user equipment.
Figure 4B:
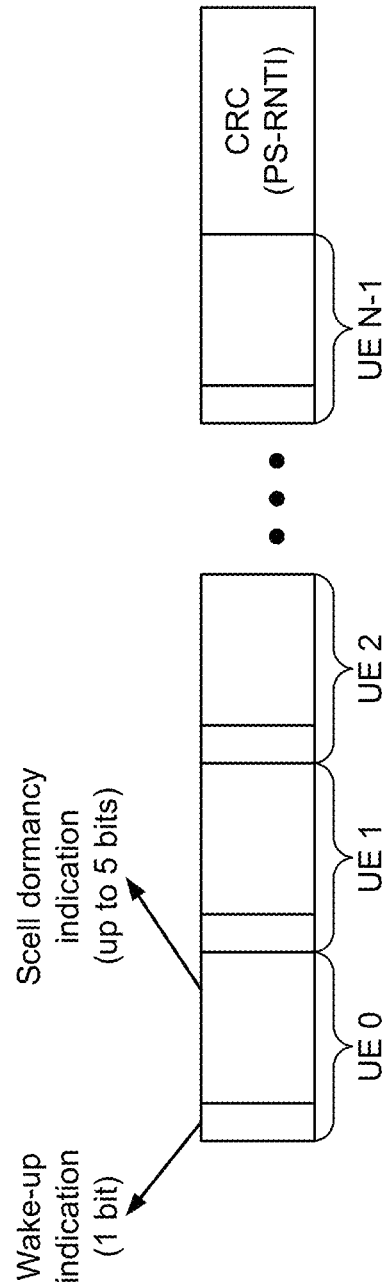

FIG. 4A illustrates an example DRX timeline for a UE. As seen, each DRX cycle is divided into on-duration and off-duration time. Between successive on-duration times, the PCell may transmit a wakeup signal during a WUS occasion. FIG. 4B illustrates an example of WUS transmission during a WUS occasion. As seen, the WUS may comprise indications for one or more UEs. For each UE, there can be one wakeup indication and up to five SCell dormancy indications, one for each SCell group. An SCell group may include one or more SCells. In an aspect, each of the wakeup and dormancy indication may be one bit in length. Thus, the entire WUS occasion, from the perspective of the UE, can be very short, e.g., only 6 bits.

For example, if the wakeup indication in the current DRX cycle indicates that resources are scheduled for the UE, the UE should monitor the PDCCH of the PCell in the next DRX cycle to receive scheduling information. On the other hand, if the wakeup indication in the current DRX cycle does not indicate that resources are scheduled for the UE, then the UE need not monitor the PDCCH from the PCell in the next DRX cycle, and thereby save power.

For each SCell dormancy indication, if the dormancy indication (e.g., one of up to five dormancy indication bits shown in FIG. 4B) indicates that the corresponding S Cell group is dormant, then the UE need only monitor the cell or cells of the SCell group for the expected measurements. The UE need not listen on the PDCCH of the SCell group, and thus save energy. On the other hand, if the dormancy indication indicates that corresponding S Cell group is not dormant, then the UE should continue to make the expected measurements and also listen on the PDCCH of the Scell group. The UE may make such measurements for up to five SCell groups.

While not specifically shown, the DCI in DRX active time may have similar fields to indicate the SCell dormancies. Also, even if a particular SCell group has multiple cells, the UE need not monitor all cells of the SCell group. That is, in an aspect, the UE may monitor a subset of cells of the SCell group.

Figure 5A:
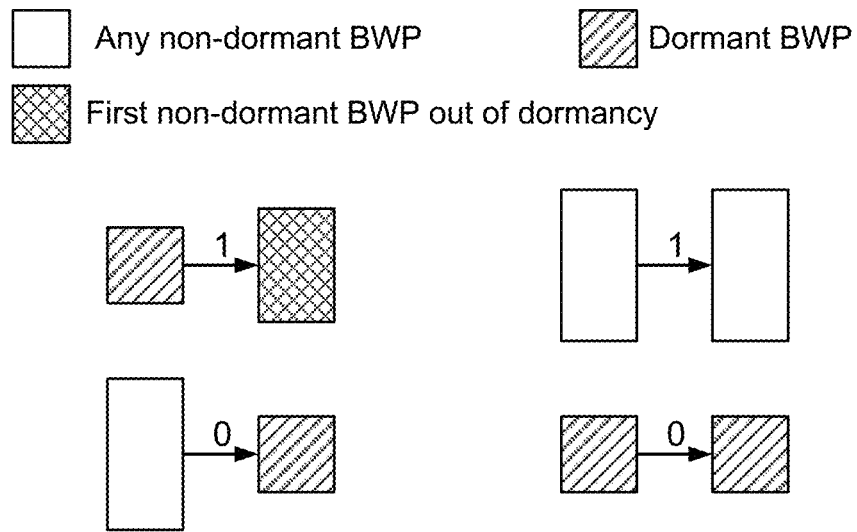
FIGS. 5A-5B illustrate examples of bandwidth part (BWP) switching performed by a user equipment.
Figure 5B:
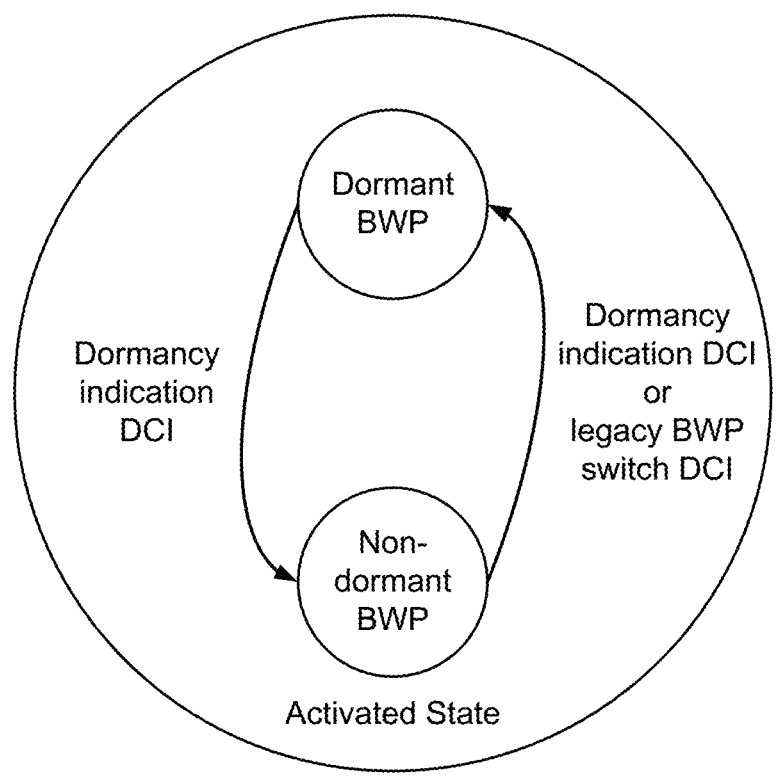

Whether the UE is within or outside the DRX active time (i.e., on-duration), the UE may interpret the SCell dormancy indications as illustrated in FIGS. 5A and 5B. FIG. 5A illustrates the BWP switching and FIG. 5B illustrates corresponding state transitions according to the interpretations of the S Cell dormancy indications, which are as follows:

If '0' is indicated by the dormancy bit field of DCI:
    If the UE is in non-dormant BWP, then the UE may switch to a dormant BWP;
    If the UE is in dormant BWP, then the UE may continue with the dormant BWP;

If '1' is indicated by the dormancy bit field of DCI:
    If the UE is in non-dormant BWP, then the UE may continue with the same non-dormant BWP;
    If the UE is in dormant BWP, then the UE may switch to a specific non-dormant BWP. In an aspect, the specific non-dormant BWP may be configured through a radio resource control (RRC) configuration.

Currently, it is the PCell that provides scheduling information, including dormancy indications, of the SCells. In one or more aspects, it is proposed to enable any of the active cells, including one or more of the SCells, to provide scheduling information including the dormancy information. More generally, it is proposed to handover, switch or otherwise transfer providing the duties of providing scheduling information of a UE from a first (or current) network node (e.g., PCell) to one or more second (or next) network nodes (e.g., SCell(s)).

One advantage of the proposal is that it can alleviate load of the PCell. For example, if the PCell, which provides the dormancy information, is too busy to notify the UE (e.g., cannot send DCI) at a certain time, one or more of the SCells can substitute for the PCell to provide some scheduling related operations. In other words, a switch (e.g., handover) of scheduling responsibilities from one cell (e.g., a PCell) to another cell (e.g., to an SCell) can take place. For ease of understanding, such switch or transfer of scheduling responsibilities may be referred to as "scheduling switch" or "scheduling-handover". In the description below, "cells" will be used for explanation. However, it should be noted that the description may apply to network nodes in general.

When the scheduling handover or switch takes place, the UE may switch from listening to a first network node (e.g., current scheduling cell) to one or more next network nodes (e.g., next scheduling cell(s)). Each of the current scheduling cell and the next scheduling cells may be the primary cell or one of the one or more secondary cells for the UE. In this context, the primary and secondary cells may be cells that are connected to provide user data to the UE. There can be different categories of switching triggers. The categories can include, among others:

DCI/MAC control element (CE) may trigger switching from previous scheduling cell or cells. That is, DCI and/or MAC CE provided from previous scheduling cell(s) may notify the UE that scheduling switch will take place. The UE in response may switch listening to next network node(s) for scheduling information, which may include dormancy indications;

Timer/counter trigger—when the timer/counter expires, the UE may switch listening to the second network node(s).

The UE may be configured, e.g., through RRC configuration messages, with a scheduling cells list, which may be a list of cells that can potentially serve as scheduling cells. In one aspect, the scheduling handover (or switch) notification (e.g., provided in DCI/MAC CE) may include an index to the scheduling cells list identifying the actual next scheduling cell. In another aspect, the scheduling cells list may be ordered. When the switching is triggered (e.g., through DCI, MAC CE, timer, counter, WUS, etc.), the UE may switch to listen to the next cell in the scheduling cells list.

Figure 6:
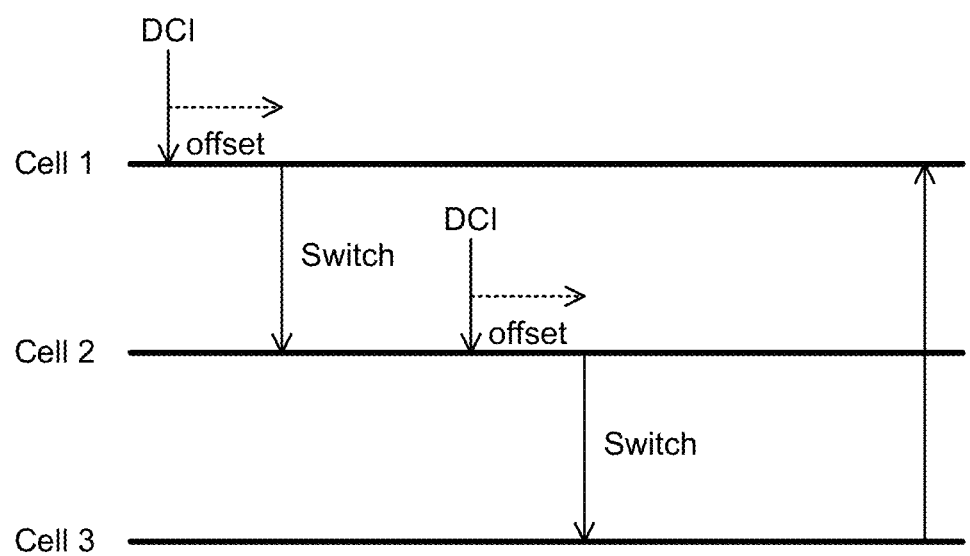
FIG. 6 illustrates an example of triggering handover of scheduling among network nodes based on offsets.

In an aspect, the scheduling handover notification (e.g., provided in DCI/MAC CE) may also include a trigger offset field to indicate when the switching should take place in the future. This is illustrated in FIG. 6. As seen, Cell 1 may transmit a DCI to inform the UE (not shown) of upcoming scheduling handover to Cell 2. The DCI from Cell 1 is assumed to include a trigger offset. When the trigger offset time passes, the UE may switch to monitoring Cell 2. That is, switch or handover of scheduling occurs from Cell 1 to Cell 2 occurs upon expiration of the trigger offset. Switch or handover of scheduling from Cell 2 to Cell 3 may happen in a similar fashion.

When the scheduling switch occurs, the new scheduling cell may be responsible for providing the UE with scheduling information, including dormancy states of other cells. Thus, switching the scheduling may include scheduling with PDCCH. There can be a variety of ways to accomplish the scheduling switch between cells, including notifying the UE of the upcoming scheduling switch.

In a first way, the WUS occasion may be used to notify the UE of the scheduling switch. When the wakeup indication of the WUS occasion indicates that the UE should wakeup, the UE may behave conventionally. That is, the UE may wakeup at the next DRX active time to monitor the PDCCH provided from the current scheduling cell (either the primary cell or one of the secondary cells) to receive the scheduling information. Also, the UE may interpret each of the dormancy indications as described above.

However, if the wakeup indication indicates that the UE need not wakeup at the next DRX active time to monitor the next PDCCH of the current scheduling cell, then the dormancy indications may be used to notify the UE of the scheduling switch. That is, the dormancy indications may be used as a form of scheduling switch notification (or scheduling handover notification) indicating that the scheduling of UL and/or DL resources will switch from the current scheduling cell to second network node(s). For example, whichever dormancy indication is set (e.g., to '1'), cell or cells of the SCell group corresponding to the dormancy indication may be the second network node(s).

Of course, it is possible that no resources are scheduled for the UE, i.e., there can be instances in which there are no data to be sent to or received from the UE. In this instance, the wakeup indication would indicate that the UE need not monitor the next PDCCH. At the same time, there may be no plans to switch the scheduling responsibilities to another cell. In such instances, the UE should not interpret the dormancy indications as the scheduling switch notification.

To enable proper interpretations of the dormancy indications, the UE may be configured with a flag—a scheduling switch flag (also referred to as scheduling handover flag)—that controls how the dormancy indications are to be interpreted. For example, when the scheduling switch flag is set (e.g., is '1'), the UE may interpret the dormancy indications as the scheduling switch notification. On the other hand, when the scheduling switch flag is not set (e.g., is '0'), the UE may interpret the dormancy indications conventionally or may interpret them as the scheduling switch notification. That is, the UE may be "hardwired" to interpret the dormancy indications under the proposed approach. In an aspect, the scheduling switch flag may be configured (set or unset) through RRC configuration message.

Alternatively, a specific field—scheduling switch flag field—may be added to the WUS. For example, if the scheduling switch flag field is set (e.g., is '1'), then the UE may interpret the dormancy indications as the scheduling switch notification. If the flag is not set, then the dormancy indications may be conventionally interpreted.

In a second way, the UE may be notified of the scheduling switch through system frame number (SFN) and/or slot. In this instance, one or multiple SFNs/slots and/or timing patterns may be specified ahead of time, e.g., through RRC configuration. Then the selection of the next scheduling cell(s) may be dependent on the SFN/slot of the next PDCCH. For example, for a particular SFN/slot, cell 1 may be the next scheduling cell, for another SFN/slot, cell 2 may be the next scheduling cell, and so on. In an aspect, the mapping of the cells to the SFNs/slots may be configured through RRC configuration.

In a second way, the UE may be notified of the scheduling switch through system frame number (SFN) and/or slot. In this instance, one or multiple SFNs/slots and/or timing patterns may be specified ahead of time, e.g., through RRC configuration. Then the selection of the second network node(s) may be dependent on the SFN/slot of the next PDCCH. For example, for a particular SFN/slot, cell 1 may be the second network node, for another SFN/slot, cell 2 may be the second network node, and so on. In an aspect, the mapping of the cells to the SFNs/slots may be configured through RRC configuration.

When the scheduling switch does take place, the next scheduling cell becomes the scheduling cell and provides the scheduling information to the UE. That is, the UE may monitor the PDCCH of the new current scheduling cell. The new current scheduling cell may use DCI, MAC CE, WUS occasion, etc. to provide dormancy indications to the UE. That is, the new current scheduling cell may remain as the scheduling cell to the UE until a scheduling handover to another next cell takes place.

But in an aspect, there may be a default scheduling cell (e.g., primary cell) such that the scheduling is handed over or otherwise switched back to the designated cell from a non-default scheduling cell. For example, if the primary cell is the default scheduling cell and the scheduling is switched to a secondary cell, then when the scheduling switch from the secondary cell occurs, it may be switched back to the primary cell.

In one way, when the non-default scheduling cell—e.g., a secondary cell—starts handling the scheduling, a resume-default inactivity timer may be started. If the non-default scheduling cell does send scheduling information (e.g., DCI) to the UE before the timer expires, then the resume-default inactivity timer may be restarted, and the non-default scheduling cell may continue to be the scheduling cell for the UE. However, if the resume-default inactivity timer does expire, then scheduling may be switched back to the default scheduling cell.

In another aspect, there may not be a default scheduling cell. In this instance, the current scheduling cell may provide indications of the next scheduling cell(s). Such indications, also referred to as identity indications, may be information that is sufficient for the UE to identify the cell or cells chosen to be the next scheduling cell(s). In one aspect, the identity indications may actually be the cell identities such as physical cell ID (PCI), NR cell global identifier (NCGI), gNB identifier (gNB ID), global gNB ID, and so on.

Alternatively or in addition thereto, the identity indications may be information that maps to the next scheduling cell(s). For example, as discussed above, the primary and secondary cells may be mapped to SFNs and/or slots, and the current scheduling cell may provide the UE with SFNs and/or slots (e.g., in DCI, MAC CE, etc.) as the identity indications. As another example, recall that the UE may be configured with the scheduling cells list (or scheduling nodes list). In this instance, the UE may be provided with one or more indices to the scheduling cells list as the identity indications.

In yet another aspect, the second network node(s) may be set, i.e., the identity list need not be provided to the UE. Recall from above that the cells in the scheduling cells list may be ordered. In this instance, the second network node(s) may be determined by the ordering of the cells in the list. Alternatively, the scheduling cells list may not specify any order. In this instance, the second network node(s) may be determined in a round robin fashion.

Figure 7:
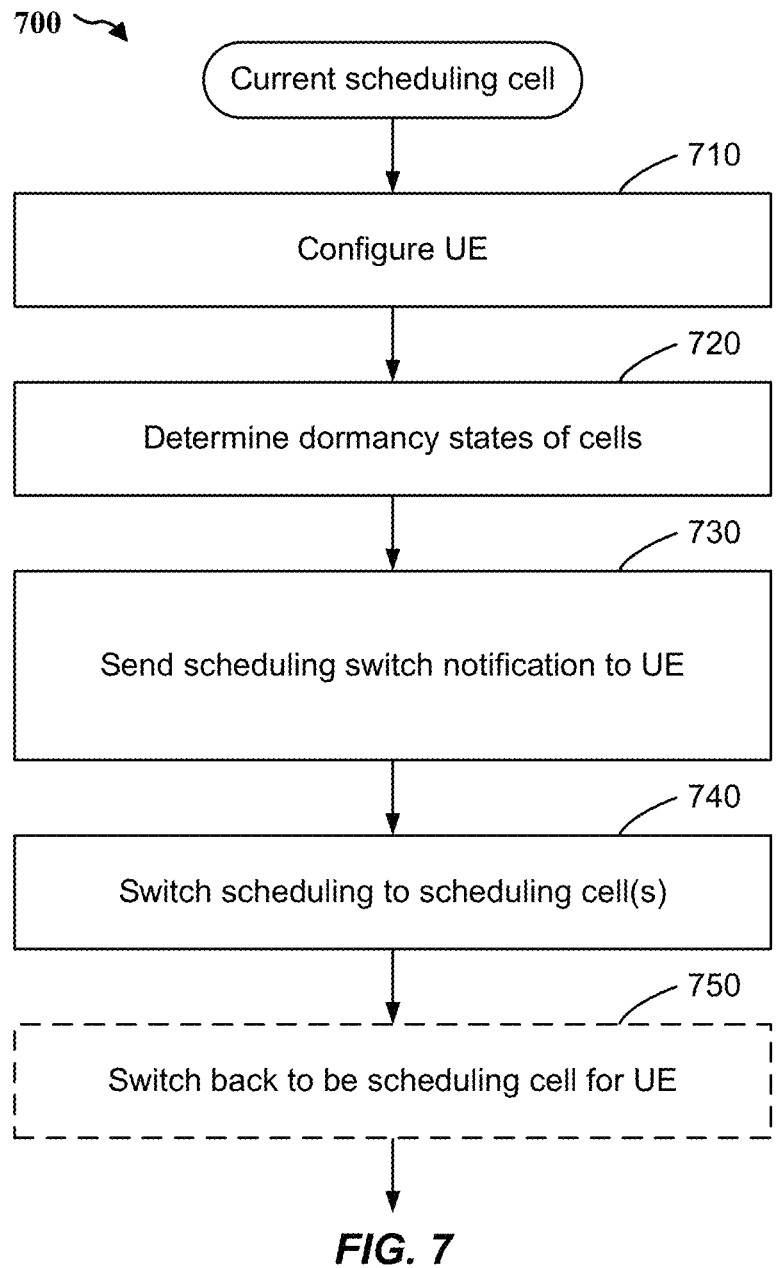
FIGS. 7-8B illustrate flow charts of an exemplary method of operating a network node, according to various aspects.

FIG. 7 illustrates a flow chart of an example method 700 of a first network node (e.g., apparatus 304, apparatus 306) to perform a scheduling switch to one or more second network nodes (e.g., apparatus(es) 304, apparatus(es) 306). In an aspect, the UE may be in connection with the first network node and one or more second network nodes simultaneously. For example, the first network node may be a primary cell (PCell) and the one or more second network nodes may be one or more SCells corresponding to the PCell. That is, the first and the second network nodes may be simultaneously connected with the UE (e.g., in EUTRA-NR Dual Connectivity (EN-DC)) to exchange data. The first network node may have both user and control data connection with the UE, and the one or more second network nodes may have user data connections with the UE. In an aspect, there may not be any control data connections between the UE and the one or more second network nodes, at least prior to scheduling switch taking place.

The first network node may currently be providing scheduling information to a UE, i.e., the first network node may currently be the scheduling node for the UE. The scheduling node (such as the first network node) may provide the scheduling information, which may comprise information on uplink (UL) communication resources (e.g., PUSCH) and/or downlink (DL) communication resources (e.g., PDSCH) scheduled for the UE to communicate with the first network node and/or the one or more second network nodes.

In one aspect, the first network node may be a network entity providing network functions. In such instances, the first network node may communicate with the UE through cells, base stations, eNBs, gNBs, access points, etc. of the network. In another aspect, the first network node may be a cell, base station, transmission point, etc. of a network. Similarly, each second network node may be a cell, base station, transmission point, etc. of the network.

In the description of FIG. 7 (and of FIGS. 8A and 8B), it may be assumed that the first network node is a current scheduling cell to the UE. Therefore, "current scheduling cell" phrase will be used in the description for ease of reference. However, it should be noted that the concept may be generalized to network nodes.

In block 710, the current scheduling cell (e.g., (transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may configure the UE in various ways. The current scheduling cell may configure the UE in any one or more of the following (not necessarily exhaustive):

A scheduling cells list comprising one or more cells that can function as a scheduling cell for the UE. Each cell in the list may be a primary cell or one of the secondary cells;

Dormant and/or non-dormant bandwidth parts (BWPs) of the primary and/or secondary cells;

A scheduling handover flag;

System frame number (SFN) and/or slots that map to the primary and/or the secondary cells;

Trigger offset time;

Resume-default timer and/or resume-default inactivity timer.

In an aspect, the current scheduling cell may configure the UE through RRC configuration messages.

In block 720, the current scheduling cell (e.g., (network interface 380, transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may determine the dormancy states of the primary and/or secondary cells (more generally, dormancy states of first network node and/or the one or more second network nodes). For example, the current scheduling cell may communicate with other cells through X2 or Xn interface.

In block 730, the current scheduling cell (e.g., (transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may send a scheduling handover notification (or scheduling switch notification) to the UE. The scheduling handover notification may indicate that scheduling of UL and/or DL resources for the UE will be handed over from the current scheduling cell to one or more next scheduling cells. Each of the one or more next scheduling cell may be the primary cell (assuming that the current scheduling cell is not the primary cell) or one of the secondary cells.

Figure 8A:
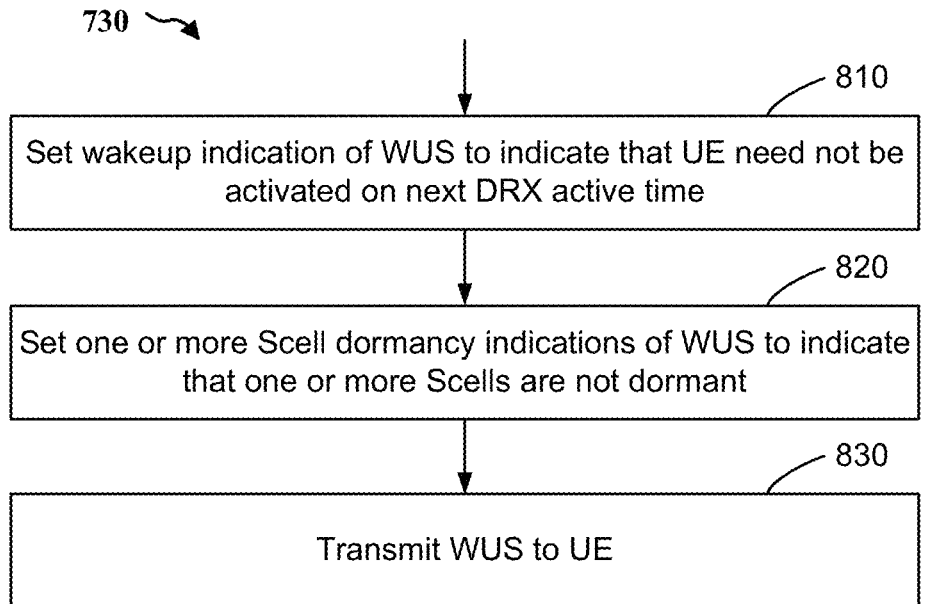

In one aspect, the scheduling handover notification may be sent on the WUS occasion of the UE (e.g., see FIGS. 4A, 4B). FIG. 8A illustrates a flow chart of a process performed by the current scheduling cell to implement block 730. In this implementation, it may be assumed that the current scheduling cell has configured the UE to set the scheduling handover flag (or scheduling switch flag) (e.g., in block 710). Recall from above that when the scheduling handover flag is set, the UE may interpret the WUS bits as the scheduling handover notification.

In block 810, the current scheduling cell (e.g., (processing system 384, memory 386, scheduling switch module 388, etc. of apparatus 304), (processing system 394, memory 396, scheduling switch module 389, etc. of apparatus 306), etc.) may set the wakeup indication bit of the WUS to indicate that the UE need not be activated on the next DRX active time.

In block 820, the current scheduling cell (e.g., (processing system 384, memory 386, scheduling switch module 388, etc. of apparatus 304), (processing system 394, memory 396, scheduling switch module 389, etc. of apparatus 306), etc.) may set one or more SCell dormancy (more generally, node dormancy) indications of the WUS to indicate that one or more SCells (e.g., second network nodes) are not dormant.

In block 830, the current scheduling cell (e.g., (transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may transmit the WUS to the UE.

Figure 8B:
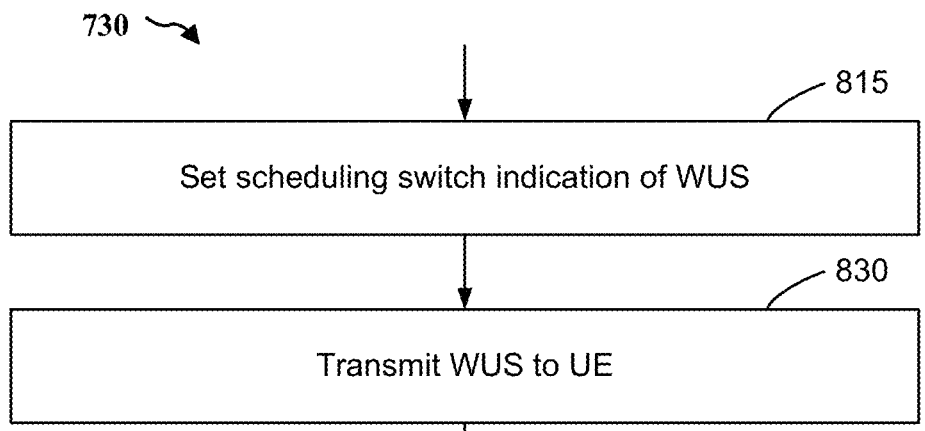

FIG. 8B illustrates a flow chart of another process performed by the current scheduling cell to implement block 730. In this implementation, it may be assumed that the WUS occasion for the UE also includes a scheduling handover indication (or scheduling switch indication) (e.g., a bit). When the scheduling handover indication is provided in the WUS itself, separately configuring the scheduling switch may be unnecessary.

In block 815, the current scheduling cell (e.g., (processing system 384, memory 386, scheduling switch module 388, etc. of apparatus 304), (processing system 394, memory 396, scheduling switch module 389, etc. of apparatus 306), etc.) may set the scheduling handover indication in the WUS.

In block 830, the current scheduling cell (e.g., (transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may transmit the WUS to the UE.

Referring back to FIG. 7, in an aspect, the scheduling handover notification sent in block 730 may include information sufficient for the UE to identify the one or more next cells. That is, the scheduling switch notification may include identity indications of the one or more next scheduling cells. In one implementation, the identity indications may comprise actual IDs of the next scheduling cells. For example, each identity indication may be a physical cell ID (PCI), an NR cell global identifier (NCGI), a gNB identifier (gNB and/or a global gNB ID. In another implementation, each identity indication may comprise an SFN and/or slot number. In this implementation, each cell may be mapped to a combination of the SFN and/or slot numbers. In a further implementation, each identity indication may map to one of the cells of the scheduling cells list configured in the UE (e.g., in block 710).

In an alternative aspect, the next scheduling cells may be identified without the current scheduling cell having to provide any identity indications. That is, there may be rules or protocol that the UE is expected to implement when choosing or identifying the next scheduling cells. In one implementation, the UE may choose the next scheduling cells from the configured scheduling cells list. For example, the cells in the scheduling cells list may be ordered, and the choices of the next scheduling cells may be based on the ordering. Alternatively, the next scheduling cells may be chosen in a round robin fashion.

In block 740, the current scheduling cell (e.g., (transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may handover or otherwise switch the scheduling to the one or more next scheduling cells. From the perspective of the current scheduling cell, when the switch (e.g., handover) occurs, the scheduling responsibilities—responsibility for providing scheduling information—for the UE may switch over to the one or more next scheduling cells.

The timing of the switch may be determined in various ways. In one implementation, the handover may occur at the DRX active time subsequent to when the scheduling handover notification was sent to the UE, i.e., subsequent to block 730. For example, when the UE is notified of the scheduling switch through the WUS occasion (e.g., during DRX off-duration of a DRX cycle), the actual switch may happen at the DRX active time that follows the DRX off-duration in which the WUS is provided (e.g., see FIGS. 4A, 4B). In another example, the switch may occur after a passage of a trigger offset time since sending the scheduling handover notification. In this example, the current scheduling cell may start a trigger offset timer when block 730 is performed, and perform block 740 when the trigger offset timer expires. The trigger offset may also be configured in the UE (e.g., in block 710). In a further example, the current scheduling cell may include the trigger offset in the scheduling handover notification (e.g., in DCI, MAC CE etc., see FIG. 6).

In block 750, the current scheduling cell (e.g., (transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may switch back to be the scheduling cell for the UE. That is, the scheduling may be switched back over to the current scheduling cell. In this instance, the current scheduling cell may be a default scheduling cell. In one implementation, the switch back may occur upon expiration of a resume-default inactivity timer, which is a timer that is restarted each time a DCI is sent to the UE from the one or more next scheduling cells. In this implementation, the scheduling responsibilities are handed back over to the current scheduling cell when no DCI is sent to the UE before the resume-default inactivity timer. In another implementation, the switch back may occur upon expiration of a resume-default timer. Unlike the resume-default inactivity timer, the resume-default timer may be a timer that is not restarted regardless of whether or not the DCI is sent to the UE by the one or more next cells. In this another implementation, the scheduling responsibilities are handed back over to the current scheduling cell within a fixed amount of time.

Figure 9:
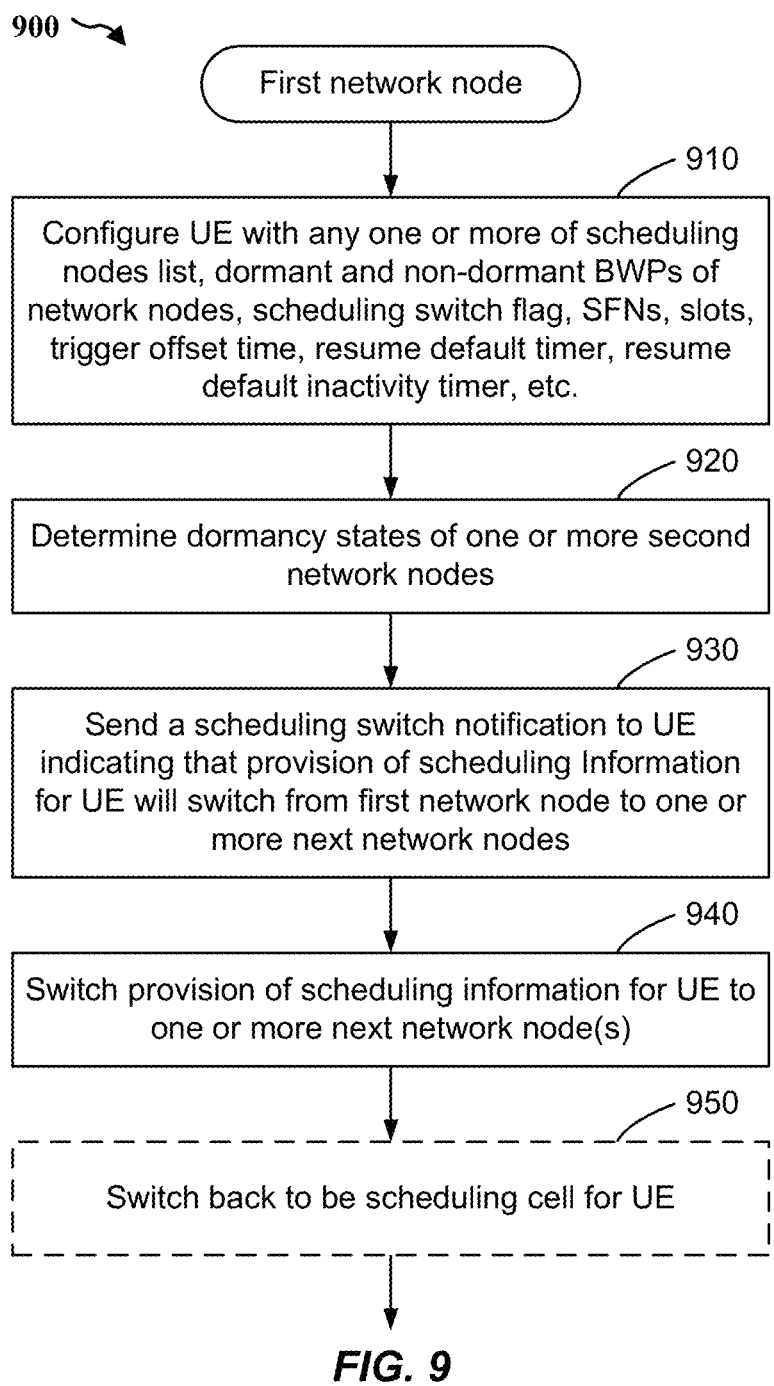
FIGS. 9-10B illustrate flow charts of another exemplary method of operating a network node, according to various aspects.

FIG. 9 illustrates a flow chart of another example method 900 of a first network node (e.g., apparatus 304, apparatus 306) to perform a scheduling switch to one or more second network nodes (e.g., apparatus(es) 304, apparatus(es) 306). The method 900 of FIG. 9 may be viewed as a generalization of method of FIG. 7. Again, the UE may be in connection with the first network node and one or more second network nodes simultaneously. For example, the first network node may be a primary cell (PCell) and the one or more second network nodes may correspond to one or more SCells corresponding to the PCell. The first network node may have both user and control data connection with the UE, and the one or more second network nodes may have user data connections with the UE. The first network node may currently be the scheduling node for the UE, i.e., the first network node may currently be responsible for providing scheduling information to the UE.

In block 910, the first network node (e.g., (transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may configure the UE in various ways as seen below (not necessarily exhaustive):

- A scheduling nodes list comprising one or more network nodes that can function as a scheduling node for the UE. Each network node in the list may be the first network node or one of the second network nodes or a network entity;
- Dormant and/or non-dormant bandwidth parts (BWPs) of the network nodes;
- A scheduling switch flag;
- System frame number (SFN) and/or slots that map to the network nodes;
- Trigger offset time;
- Resume-default timer and/or resume-default inactivity timer.

In an aspect, the first network node may configure the UE through RRC configuration messages.

In block 920, the first network node (e.g., (network interface 380, transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may determine the dormancy states of the one or more second network nodes. In an aspect, the first network node may determine the dormancy states of the network nodes that have user data connections with the UE (e.g., of the primary and/or secondary cells). In an aspect, the first network node may communicate with other network nodes through X2, Xn, S1 or NG interface.

In block 930, the first network node (e.g., (transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may send a scheduling switch notification to the UE. The scheduling switch notification may indicate that scheduling information will be provided by one or more next network nodes after the scheduling switch. That is, the provision of the scheduling information may switch from the first network node to the one or more next network nodes. The one or more next network nodes may comprise the first network node, at least one second network node, or both.

Figure 10A:
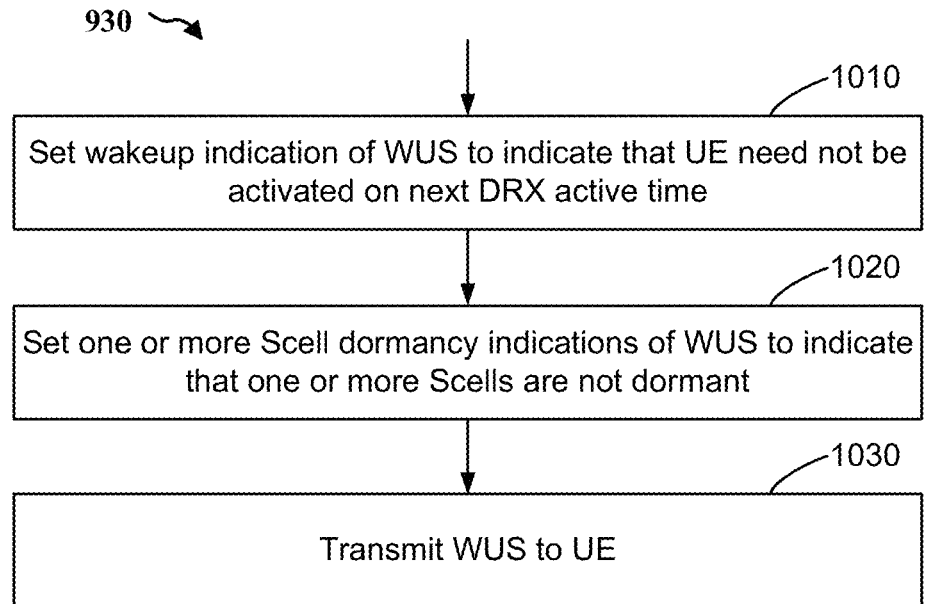

The scheduling switch notification may be sent on the WUS occasion of the UE (e.g., see FIGS. 4A, 4B). FIG. 10A illustrates a flow chart of a process performed by the first network node to implement block 930. Process of FIG. 10A may be viewed as a generalization of process illustrated in FIG. 8A. In this implementation, it may be assumed that the first network node has configured the UE to set the scheduling switch flag (e.g., in block 910). As such, the UE may interpret the WUS bits as the scheduling switch notification.

In block 1010, the first network node (e.g., (processing system 384, memory 386, scheduling switch module 388, etc. of apparatus 304), (processing system 394, memory 396, scheduling switch module 389, etc. of apparatus 306), etc.) may set the wakeup indication, which may be a bit, of the WUS to indicate that the UE need not be activated on the next DRX active time.

In block 1020, the first network node (e.g., (processing system 384, memory 386, scheduling switch module 388, etc. of apparatus 304), (processing system 394, memory 396, scheduling switch module 389, etc. of apparatus 306), etc.) may set one or more node dormancy indications of the WUS corresponding to one or more second network nodes of the network. When the one or more node dormancy indications are set, they may indicate that the corresponding one or more second network nodes are not dormant. In an aspect, this may also be interpreted as the corresponding BWPs as being active.

In block 1030, the first network node (e.g., (network interface 380, transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may transmit the WUS to the UE.

Figure 10B:
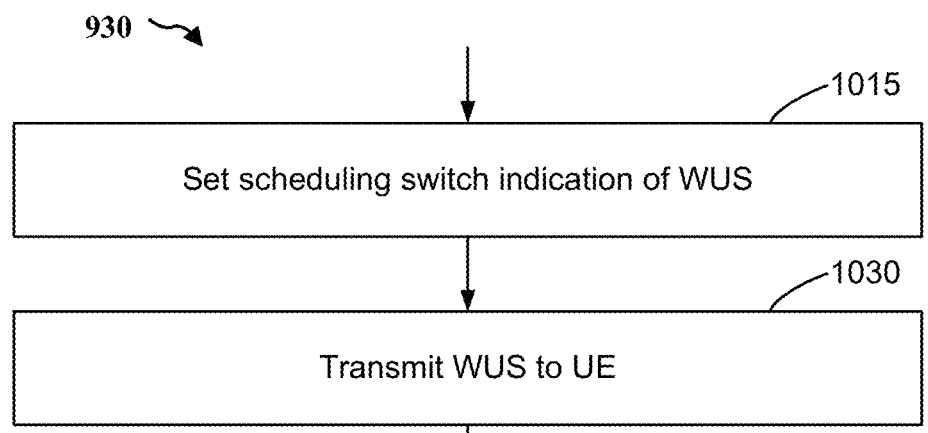

FIG. 10B illustrates a flow chart of another process performed by the first network node to implement block 930. Process of FIG. 10B may be viewed as a generalization of process illustrated in FIG. 8B. In this implementation, it may be assumed that the WUS occasion for the UE also includes a scheduling switch indication (e.g., a bit). When the scheduling switch indication is provided in the WUS itself, separately configuring the scheduling switch may be unnecessary.

In block 1015, the first network node (e.g., (processing system 384, memory 386, scheduling switch module 388, etc. of apparatus 304), (processing system 394, memory 396, scheduling switch module 389, etc. of apparatus 306), etc.) may set the scheduling switch indication in the WUS.

In block 1030, the first network node (e.g., (network interface 380, transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may transmit the WUS to the UE.

Referring back to FIG. 9, in an aspect, the scheduling switch notification sent in block 930 may include information sufficient for the UE to identify the one or more next network nodes. In other words, the scheduling switch notification may include identify indication sufficient for the UE to identify which of first and second network nodes may next serve as the scheduling node or nodes for the UE. Examples of identity indications are discussed above with respect to FIG. 7, and thus will not be repeated here for brevity. Alternatively, the next network nodes may be identified without the first network node having to provide any identity indications. This has also been discussed above with respect to FIG. 7, and thus will not be repeated.

In block 940, the first network node (e.g., (network interface 380, transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may handover, transfer, or otherwise switch the provision of scheduling information from the first network node to the one or more network nodes. That is, information on communication resources scheduled for the UE to communicate with the first and/or the one or more second network nodes may be provided by the one or more next network nodes after the switch.

In an aspect, after the switch, the next network nodes may have both user and control data connection with the UE. Also, "other" network nodes may have user data connections with the UE. In this instance, the other network nodes may be the network nodes among the first and second network nodes other than the one or more next network nodes. In an aspect, there may not be any control data connections between the UE and the other network nodes after the switch and prior to another switch taking place. The timing of the scheduling switch may be determined in various ways. Such ways have been described above in discussion with respect to block 740 of FIG. 7, and thus will not be repeated.

In block 950, the first network node (e.g., (transceiver 350, transceiver 360, processing system 384, memory 386, scheduling switch module 388, etc. of apparatus 304), (network interface 390, processing system 394, memory 396, scheduling switch module 389, etc. of apparatus 306), etc.) may switch back to be the scheduling node for the UE. That is, provision of scheduling information for the UE may switch back to the first network node. For example, the first network node may be the default scheduling node or default network node for the UE. Various switch back implementations are described above in discussion with respect to block 750 of FIG. 7, and thus will not be repeated.

Figure 11:
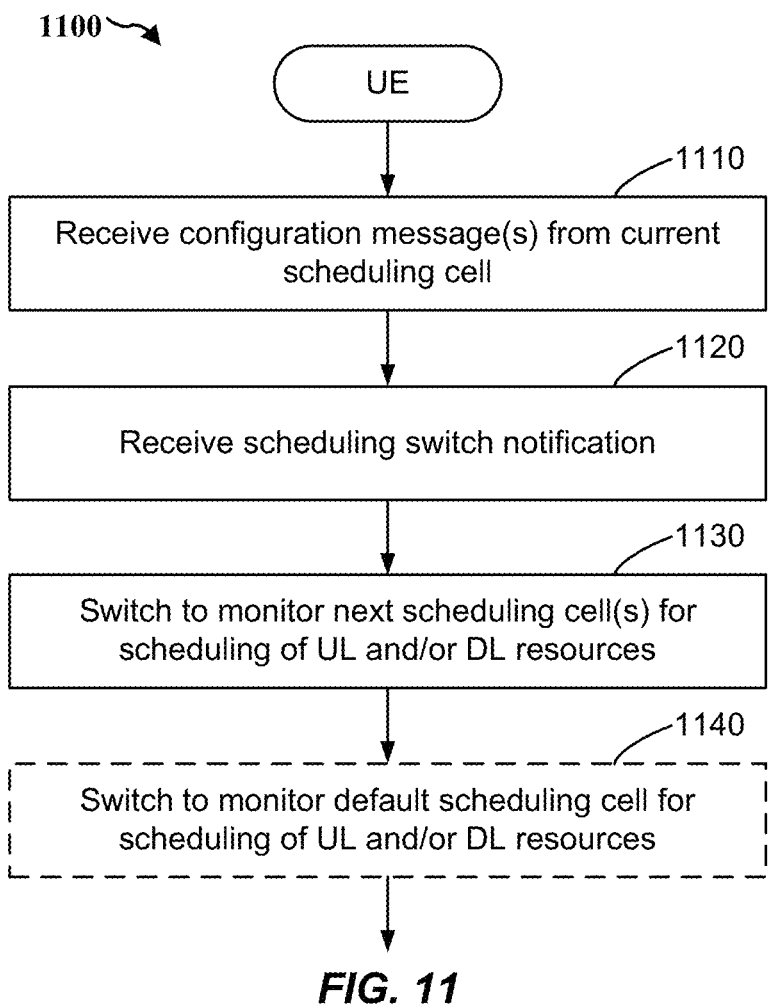
FIGS. 11-12B illustrate flow charts of an exemplary method of operating a user equipment, according to various aspects.

FIG. 11 illustrates a flow chart of an example method 1100 of a UE to perform scheduling switch. The UE may correspond to any of the UEs described above (e.g., UE 104, UE 204, apparatus 302). In an aspect, the UE may be in connection with the first network node and one or more second network nodes simultaneously (e.g., in EUTRA-NR Dual Connectivity (EN-DC)) to exchange data. The first network node may have both user and control data connection with the UE, and the one or more second network nodes may have user data connections with the UE. The first network node may currently be providing scheduling information to a UE, i.e., the first network node may currently be the scheduling node for the UE. In the description of FIG. 11 (and of FIGS. 12A and 12B), it may be assumed that the first network node is a current scheduling cell to the UE. Therefore, "current scheduling cell" phrase will be used in the description for ease of reference.

In block 1110, the UE (e.g., transceiver 310, transceiver 320, processing system 332, memory 340, scheduling switch module 342, etc.) may receive configuration messages (e.g., RRC messages) from the current scheduling cell. A non-exhaustive list of configurations are discussed above with respect to block 710 of FIG. 7.

In block 1120, the UE (e.g., transceiver 310, transceiver 320, processing system 332, memory 340, scheduling switch module 342, etc.) may receive the scheduling handover notification from the current scheduling cell.

Recall that in one aspect, the scheduling handover notification may be received on the WUS occasion of the UE (e.g., see FIGS. 4A, 4B). In one implementation, it may be assumed that the UE has been configured to set the scheduling handover flag (e.g., in block 1110). When the scheduling handover flag is set, the UE may determine that it has received the scheduling handover notification on the WUS occasion when the wakeup indication of the WUS indicates that the UE need not be activated on the next discontinuous reception (DRX) active time, and when one or more SCell dormancy indications of the WUS indicate that one or more SCells are not dormant.

In another implementation, the UE may determine that it has received the scheduling handover notification on the WUS occasion when the scheduling switch indication (e.g., a bit) of the WUS is set.

In an aspect, the scheduling switch notification received in block 1120 may include identity indications of the one or more next cells, and the UE may identify the one or more next scheduling cells based on the identity indications. In one implementation, the identity indications may comprise actual IDs of the next cells. That is, each identity indication may be a physical cell ID (PCI), an NR cell global identifier (NCGI), a gNB identifier (gNB ID), and/or a global gNB ID. In another implementation, each identity indication may comprise an SFN and/or slot number. In this implementation, each cell may be mapped to a combination of the SFN and/or slot numbers. In a further implementation, each identity indication may map to one of the cells of the scheduled cells list configured in the UE (e.g., in block 1110).

In an alternative aspect, the UE may identify the one or more next scheduling cells without receiving any identity indications from the current scheduling cell. In one implementation, the UE may identify or otherwise choose the next scheduling cells from the configured scheduling cells list. For example, the cells in the scheduling cells list may be ordered, and the choices of the next scheduling cells may be based on the ordering. Alternatively, the next scheduling cells may be chosen in a round robin fashion.

In block 1130, the UE (e.g., transceiver 310, transceiver 320, processing system 332, memory 340, scheduling switch module 342, etc.) may switch to monitor the one or more next scheduling nodes to receive the scheduling information for the UE. In other words, the switch of the scheduling may be performed in block 1130. For example, the UE may monitor the PDCCH of the one or more next scheduling nodes to receive the DCIs.

The timing of the switch may be determined in various ways. In one implementation, the switch may occur at the DRX active time subsequent to when the scheduling switch notification is received, i.e., subsequent to block 1120. For example, the switch may happen at the next DRX active time after receiving the scheduling switch notification on the WUS occasion (e.g., see FIGS. 4A, 4B). In another example, the switch may occur after a passage of a trigger offset time since receiving the scheduling switch notification. In this example, the UE may start a trigger offset timer when block 1120 is performed, and perform block 1130 when the trigger offset timer expires. The trigger offset may also be configured in the UE (e.g., in block 1110). In a further example, the trigger offset may be included in the scheduling switch notification (e.g., in DCI, MAC CE etc., see FIG. 6).

In block 1140, the UE (e.g., transceiver 310, transceiver 320, processing system 332, memory 340, scheduling switch module 342, etc.) may switch to monitor a default scheduling node for resource scheduling information for the UE. The default scheduling node may be the first network node (e.g., primary cell) or any of the secondary network nodes (e.g., secondary cells).

Figure 12A:
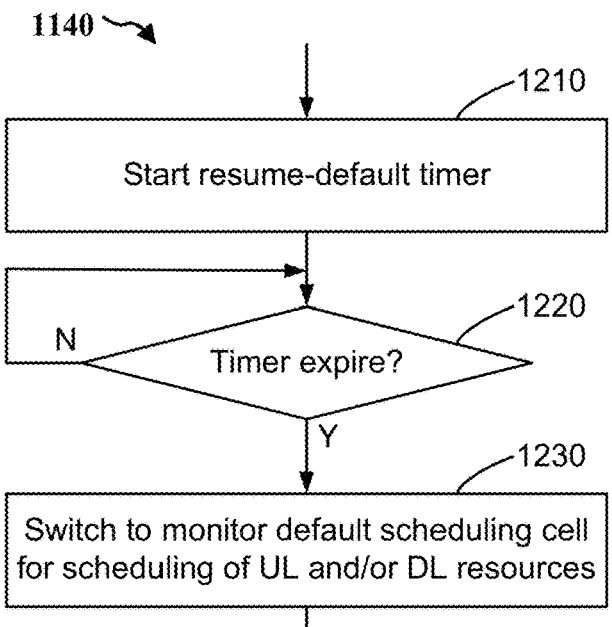

FIG. 12A illustrates an example process performed by the UE to implement block 1140. In block 1210, the UE (e.g., processing system 332, memory 340, scheduling switch module 342, etc.) may start the resume-default timer. The resume-default timer may be configured by the current scheduling cell (e.g., in block 1110).

In block 1220, the UE (e.g., processing system 332, memory 340, scheduling switch module 342, etc.) may check whether or not the resume-default timer has expired. If not (N branch from block 1220), the UE may proceed back to block 1220.

On the other hand, if the resume-default timer has expired (Y branch from block 1220), then in block 1230, the UE (e.g., transceiver 310, transceiver 320, processing system 332, memory 340, scheduling switch module 342, etc.) may switch to monitoring the default scheduling cell for scheduling of UL and/or DL resources for the UE. That is, switch of receiving scheduling information back from the default scheduling cell may be performed. As indicated the scheduling information may indicate UL and/or DL resources scheduled for the UE between the UE and the first network node and/or between the UE and the one or more secondary network nodes.

Figure 12B:
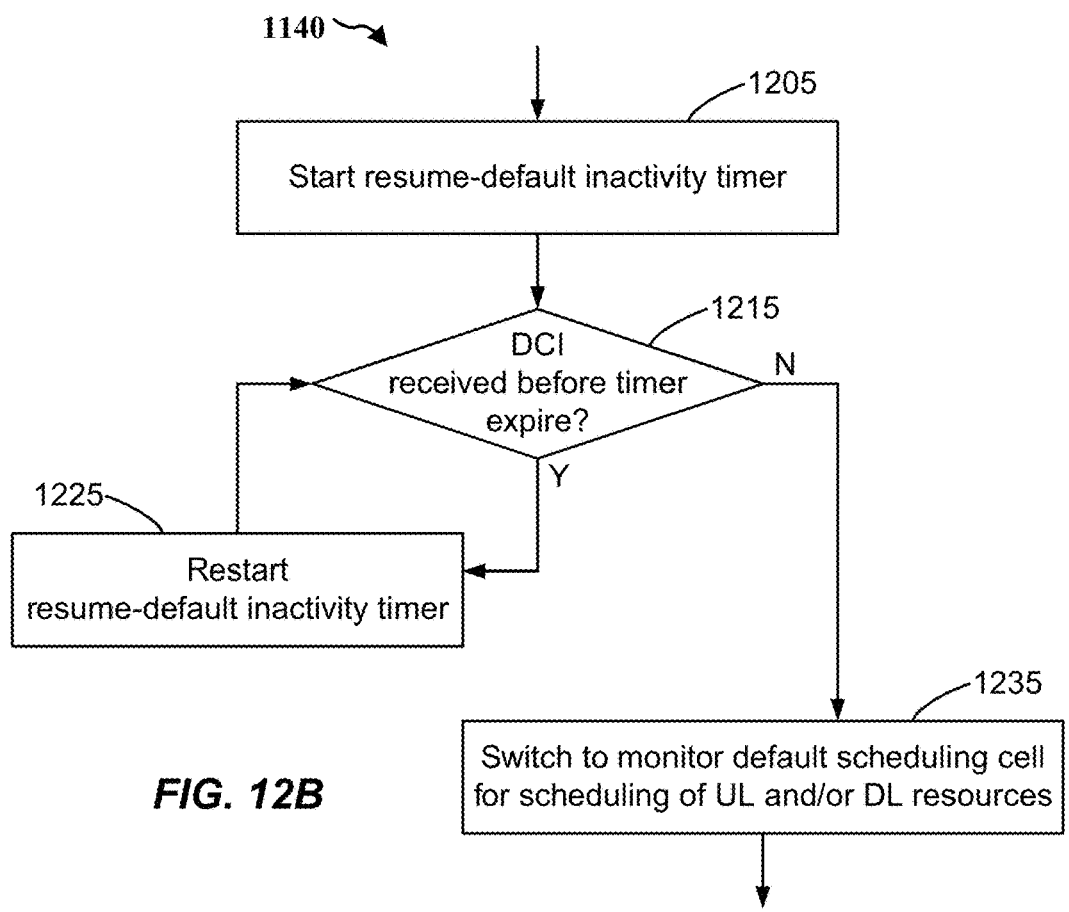

FIG. 12B illustrates an alternative example process performed by the UE to implement block 1140. In block 1205, the UE (e.g., processing system 332, memory 340, scheduling switch module 342, etc.) may start the resume-default inactivity timer. The resume-default inactivity timer may be configured by the current scheduling cell (e.g., in block 1110).

In block 1215, the UE (e.g., processing system 332, memory 340, scheduling switch module 342, etc.) may check whether or not a DCI has been received from any of the next scheduling cells before the resume-default inactivity timer has expired.

If so (Y branch from block 1215), the UE (e.g., processing system 332, memory 340, scheduling switch module 342, etc.) in block 1225 may restart the resume-default inactivity timer, and proceed back to block 1215. Note that throughout block 1205, 1215, and 1225, the UE may be monitoring the one or more next scheduling cells.

If no DCI is received before the resume-default inactivity timer expires (N branch from block 1215), then in block 1235, the UE (e.g., transceiver 310, transceiver 320, processing system 332, memory 340, scheduling switch module 342, etc.) may switch to monitoring the default scheduling cell for scheduling of UL and/or DL resources for the UE. That is, handover of scheduling to the default scheduling cell may be performed.

Figure 13:
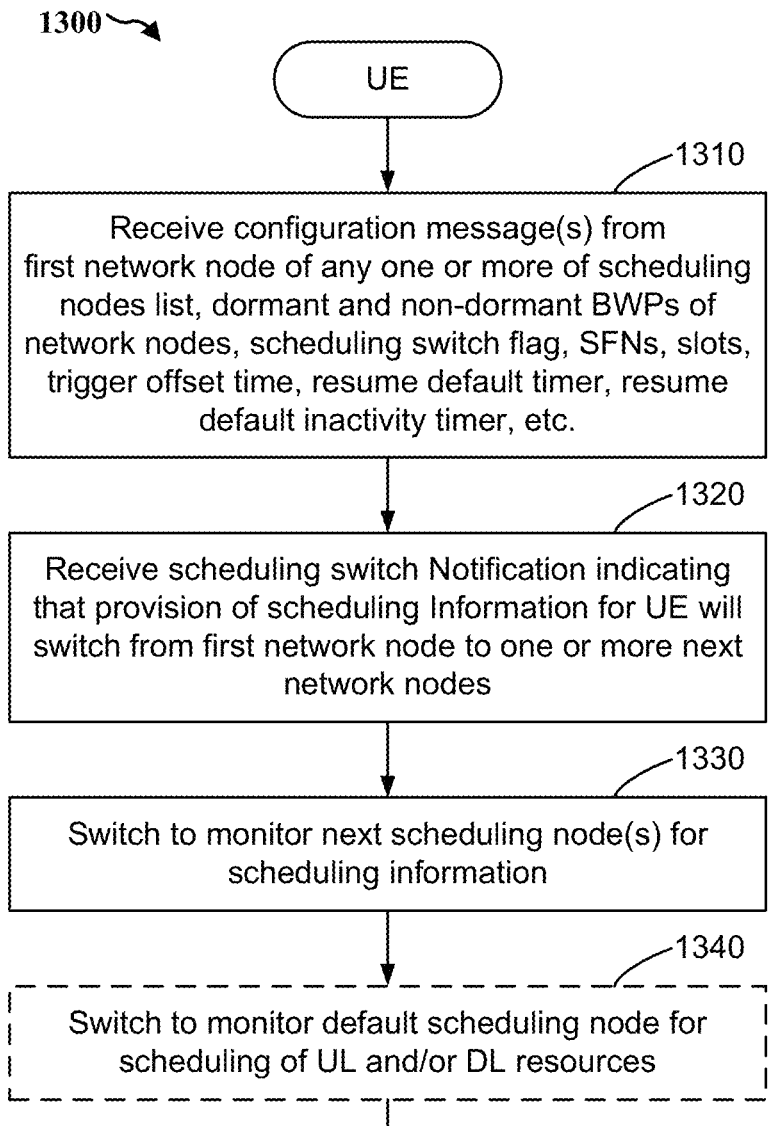
FIGS. 13-14B illustrate flow charts of another exemplary method of operating a user equipment, according to various aspects.

FIG. 13 illustrates a flow chart of an example method 1300 of a UE to perform scheduling switch. The method of FIG. 13 may be viewed as a generalization of method of FIG. 11. Similar assumptions may be made as in FIG. 11. The UE may correspond to any of the UEs described above (e.g., UE 104, UE 204, apparatus 302). The UE may be in connection with the first network node and one or more second network nodes simultaneously (e.g., in EUTRA-NR Dual Connectivity (EN-DC)) to exchange data. The first network node may have both user and control data connection with the UE, and the one or more second network nodes may have user data connections with the UE. The first network node may currently be providing scheduling information to the UE, i.e., the first network node may currently be the scheduling node for the UE.

In block 1310, the UE (e.g., transceiver 310, transceiver 320, processing system 332, memory 340, scheduling switch module 342, etc.) may receive configuration messages (e.g., RRC messages) from the first network node. A non-exhaustive list of configurations are discussed above with respect to block 910 of FIG. 9.

In block 1320, the UE (e.g., transceiver 310, transceiver 320, processing system 332, memory 340, scheduling switch module 342, etc.) may receive the scheduling switch notification from the first network node. The scheduling switch notification may indicate that the provision of scheduling information for the UE will switch from the first network node to one or more next network nodes. That is, the scheduling information may switch from being provided by the first network node to the one or more next network nodes. The one or more next network nodes may comprise the first network node, at least one second network node, or both.

The scheduling switch notification may be received on the WUS occasion of the UE (e.g., see FIGS. 4A, 4B). In one implementation, it may be assumed that the UE has been configured to set the scheduling switch flag (e.g., in block 1310). When the scheduling switch flag is set, the UE may determine that it has received the scheduling switch notification on the WUS occasion when the wakeup indication of the WUS indicates that the UE need not be activated on the next discontinuous reception (DRX) active time, and when one or more node dormancy indications of the WUS indicate that one or more secondary cells are not dormant. In another implementation, the UE may determine that it has received the scheduling switch notification on the WUS occasion when the scheduling switch indication (e.g., a bit) of the WUS is set.

In an aspect, the scheduling switch notification received in block 1320 may include identity indications of the one or more next network nodes, and the UE may identify the one or more next network nodes based on the identity indications. Examples of identity indications are discussed above with respect to FIG. 7, and thus will not be repeated here for brevity. Alternatively, the next network nodes may be identified without the first network node having to provide any identity indications. This has also been discussed above with respect to FIG. 7, and thus will not be repeated.

In block 1330, the UE (e.g., transceiver 310, transceiver 320, processing system 332, memory 340, scheduling switch module 342, etc.) may switch to monitor the one or more next scheduling nodes to receive the scheduling information for the UE in accordance with the scheduling switch notification. For example, the UE may monitor the PDCCH of the one or more next scheduling nodes to receive the DCIs that include the resources scheduled for the UE to communicate with the first network node and/or the one or more second network nodes. In an aspect, after the switch, the next network nodes may have both user and control data connection with the UE. Also, other network nodes may have user data connections with the UE. The timing of the switch may be determined in various ways. The timing of the scheduling switch may be determined in various ways. Such ways have been described above in discussion with respect to block 1130 of FIG. 11, and thus will not be repeated.

In block 1340, the UE (e.g., transceiver 310, transceiver 320, processing system 332, memory 340, scheduling switch module 342, etc.) may switch to monitor a default scheduling node for resource scheduling information for the UE. The default scheduling node may be the first network node (e.g., primary cell) or any of the second network nodes (e.g., secondary cells).

Figure 14A:
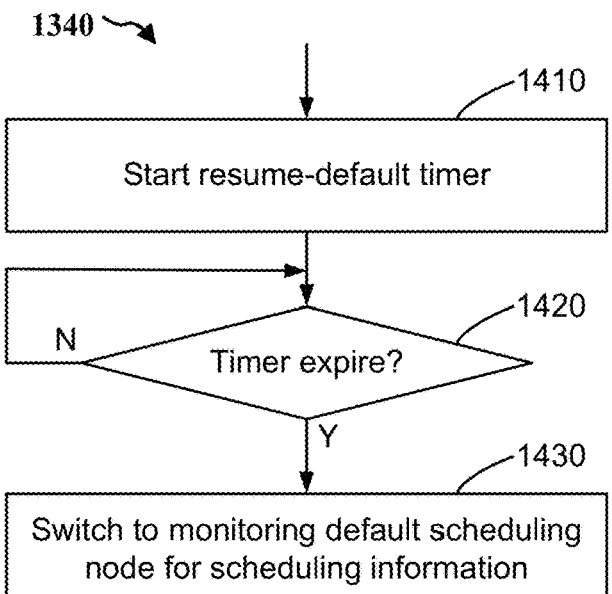

FIG. 14A illustrates an example process performed by the UE to implement block 1340. The process of FIG. 14A may be viewed as a generalization of the process of FIG. 12A. In block 1410, the UE (e.g., processing system 332, memory 340, scheduling switch module 342, etc.) may start the resume-default timer. The resume-default timer may be configured by the first network node (e.g., in block 1310).

In block 1420, the UE (e.g., processing system 332, memory 340, scheduling switch module 342, etc.) may check whether or not the resume-default timer has expired. If not (N branch from block 1420), the UE may proceed back to block 1420.

On the other hand, if the resume-default timer has expired (Y branch from block 1420), then in block 1430, the UE (e.g., transceiver 310, transceiver 320, processing system 332, memory 340, scheduling switch module 342, etc.) may switch to monitoring the default scheduling node for scheduling information. As discussed above, the scheduling information may indicate UL and/or DL resources scheduled for the UE between the UE and the default scheduling node (e.g., first network node) and/or between the UE and the one or more second network nodes.

Figure 14B:
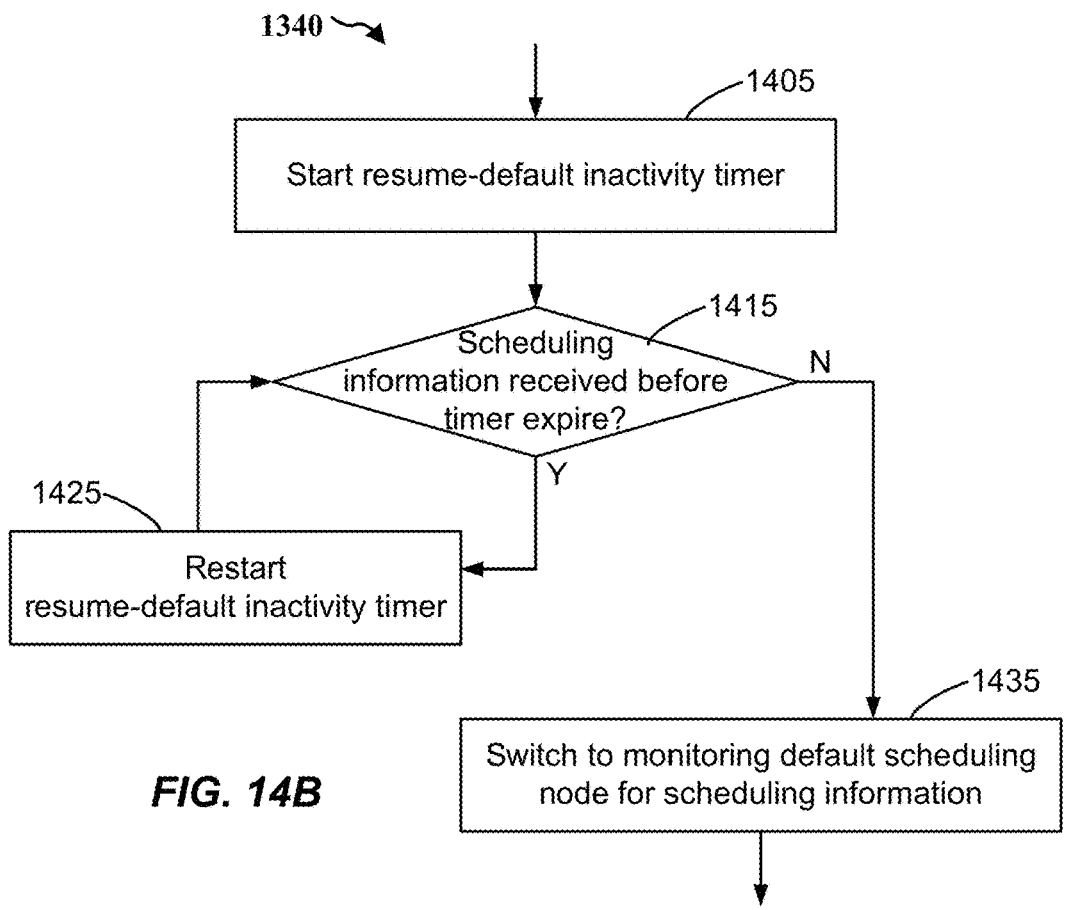

FIG. 14B illustrates an alternative example process performed by the UE to implement block 1340. In block 1405, the UE (e.g., processing system 332, memory 340, scheduling switch module 342, etc.) may start the resume-default inactivity timer. The resume-default inactivity timer may be configured by the first network node (e.g., in block 1310).

In block 1415, the UE (e.g., processing system 332, memory 340, scheduling switch module 342, etc.) may check whether or not scheduling information (e.g., in DCI) has been received from any of the next scheduling nodes before the resume-default inactivity timer has expired.

If so (Y branch from block 1415), the UE (e.g., processing system 332, memory 340, scheduling switch module 342, etc.) in block 1425 may restart the resume-default inactivity timer, and proceed back to block 1415. Note that throughout block 1405, 1415, and 1425, the UE may be monitoring the one or more next scheduling nodes.

If no scheduling information is received before the resume-default inactivity timer expires (N branch from block 1415), then in block 1435, the UE (e.g., transceiver 310, transceiver 320, processing system 332, memory 340, scheduling switch module 342, etc.) may switch to monitoring the default scheduling node for the scheduling information.

Figure 15:
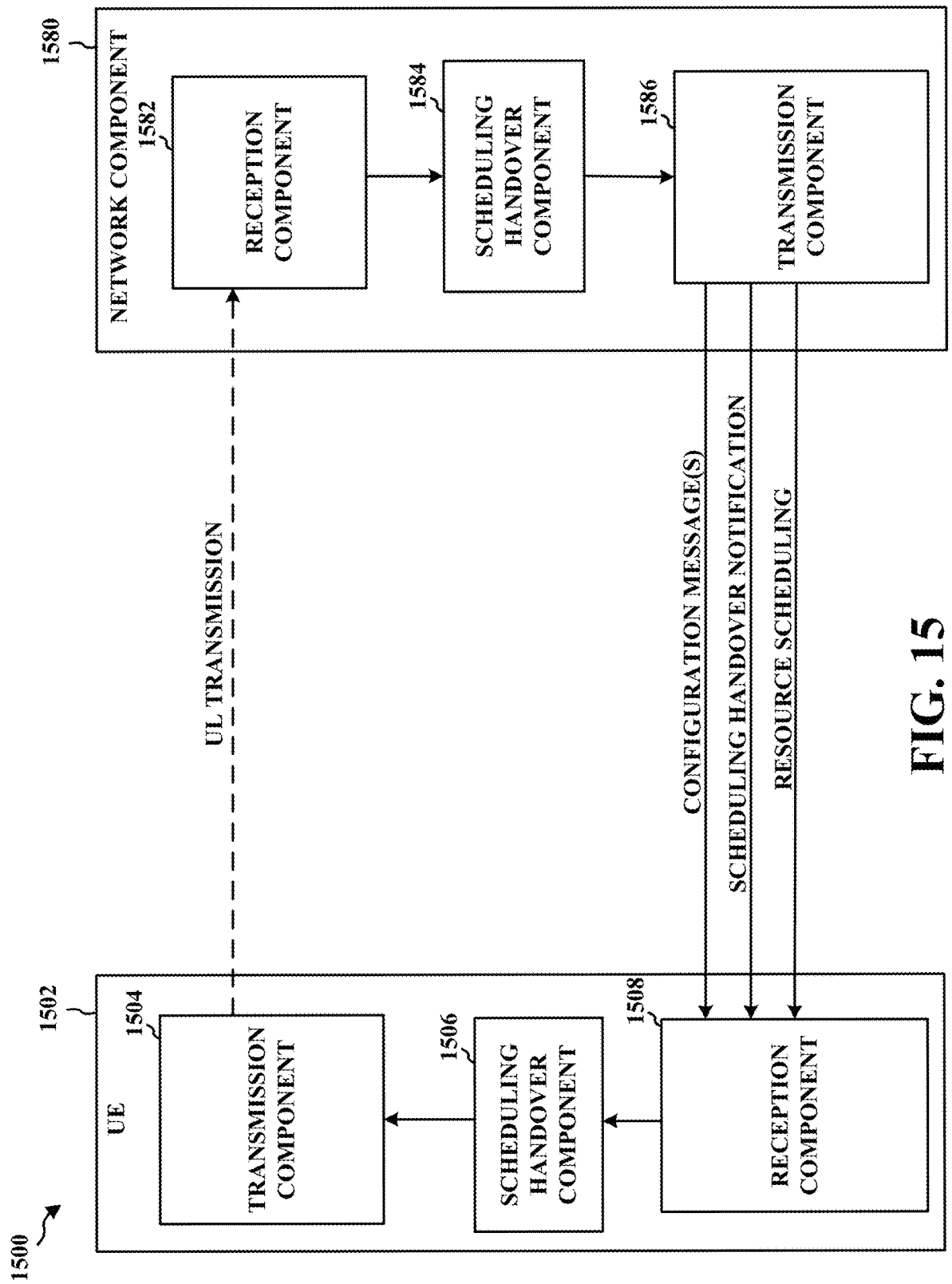
FIG. 15 is a conceptual data flow diagram illustrating the data flow between different means/components in exemplary apparatuses, according to various aspects.

FIG. 15 is a conceptual data flow diagram 1500 illustrating examples of data flows between different means/components in exemplary apparatuses 1502 and 1580 in accordance with an aspect of the disclosure. The apparatus 1502 may be a UE (e.g., UE 104, UE 204, UE 302) in communication with an apparatus 1580, which may be a network device (e.g., BS 102, gNB 222, eNB 224, BS 304, network entity 306) corresponding to a cell (first network node, second network node(s)).

The apparatus 1502 may include a transmission component 1504, which may correspond to transmitter circuitry in apparatus 302 as depicted in FIG. 3A, including transmitter 314, transmitter 324, antenna 316, antenna 326, processing system 332, memory 340, and the like. The apparatus 1502 may also include a scheduling switch component 1506 (also referred to as scheduling handover component 1506), which may correspond to processor circuitry in apparatus 302 as depicted in FIG. 3A, including processing system 332, memory 340, and the like. The apparatus 1502 may further include a reception component 1508, which may correspond to reception circuitry in apparatus 302 as depicted in FIG. 3A, including receiver 312, receiver 322, antenna 316, antenna 326, processing system 332, memory 340, etc.

The apparatus 1580 may include a reception component 1582, which may correspond to receiver circuitry in apparatus 304 as depicted in FIG. 3B including receiver 352, receiver 362, antenna 356, antenna 366, network interface 380, processing system 382, memory 386, and the like. The apparatus 1580 may also include a scheduling switch component 1584 (also referred to as scheduling handover component 1584), which may correspond to processor circuitry in apparatus 304 as depicted in FIG. 3B, including processing system 384, memory 386, and the like. The apparatus 1580 may include a transmission component 1586, which may correspond to transmitter circuitry in apparatus 304 as depicted in FIG. 3B including transmitter 354, transmitter 364, antenna 356, antenna 366, network interface 380, processing system 382, memory 386, and the like.

Referring to FIG. 15, the apparatus 1580 (e.g., the scheduling switch component 1584 through the transmission component 1586) may send configuration messages (e.g., RRC messages) and the UE 1502 (e.g., the scheduling switch component 1506 through the reception component 1508) may receive the same configuration messages as described above. When the configuration messages are received, the apparatus 1502 (e.g., scheduling switch component 1506) may configure the UE as described above.

The apparatus 1580 (e.g., the scheduling switch component 1584 through the transmission component 1586) may send scheduling switch notification (e.g., WUS, DCI, MAC CE, etc.) and the apparatus 1502 (e.g., the scheduling switch component 1506 through the reception component 1508) may receive the same scheduling switch notification as described above.

Thereafter, the apparatus 1580 (e.g., the reception component 1582, the scheduling switch component 1584, the transmission component 1586) may switch the scheduling of the UE to one or more next scheduling nodes (e.g., cells) as described above. The apparatus 1502 (e.g., the reception component 1508, the scheduling switch component 1506) may switch to monitor the one or more second network nodes for scheduling of the UL and/or DL resources for the UE as described above.

Figure 16:
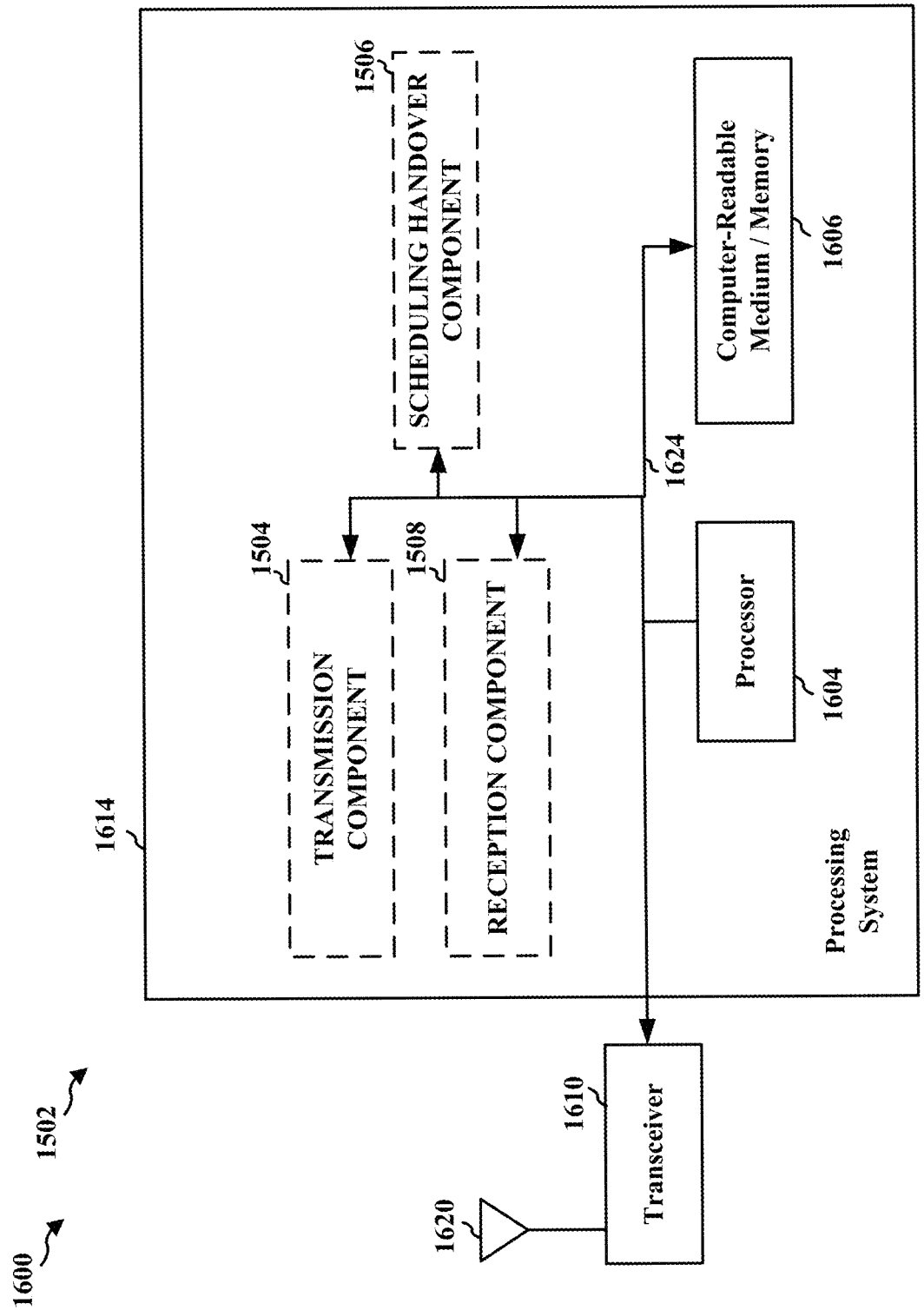
FIG. 16 is a diagram illustrating an example of a hardware implementation for an apparatus employing a processing system, according to various aspects.

FIG. 16 is a diagram 1600 illustrating an example of a hardware implementation for an apparatus 1502 employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506 and 1508, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610, which in turn may be coupled to one or more antennas 1620. The transceiver 1610 may provide means for communicating with various other apparatus over a transmission medium. The transceiver 1610 may receive a signal from the one or more antennas 1620, extract information from the received signal, and provide the extracted information to the processing system 1614, specifically the reception component 1508. In addition, the transceiver 1610 may receive information from the processing system 1614, specifically from the transmission component 1504, and based on the received information, generate a signal to be applied to the one or more antennas 1620. The processing system 1614 may include a processor 1604 coupled to a computer-readable medium/memory 1606. The processor 1604 may be responsible for general processing, including the execution of software stored on the computer-readable medium/memory 1606. The software, when executed by the processor 1604, may cause the processing system 1614 to perform the various functions described supra for any particular apparatus. The computer-readable medium/memory 1606 may also be used for storing data that is manipulated by the processor 1604 when executing software. The processing system 1614 may further include at least one of the components 1504, 1506 and 1508. The components may be software components running in the processor 1604, resident/stored in the computer readable medium/memory 1606, one or more hardware components coupled to the processor 1604, or some combination thereof. The processing system 1614 may be a component of the UE 104, UE 204, or apparatus 302.

In one configuration, the apparatus 1502 (e.g., a UE) may comprise means for receiving configuration messages from the first network node, means for receiving scheduling switch notification, means for switching to monitor the one or more second network nodes for scheduling of UL and/or DL resources for the UE, and means for switching to monitor a default scheduling node for scheduling of UL and/or DL resources for the UE.

The aforementioned means may be one or more of the aforementioned components of the apparatus 1502 and/or the processing system 1614 of the apparatus 1502 configured to perform the functions recited by the aforementioned means. The processing system 1614 may include transceiver 310 (including transmitter 314, receiver 312), transceiver 320 (including transmitter 324, receiver 322), antenna 316, antenna 326, processing system 332, memory 340, and scheduling switch module 342.

Figure 17:
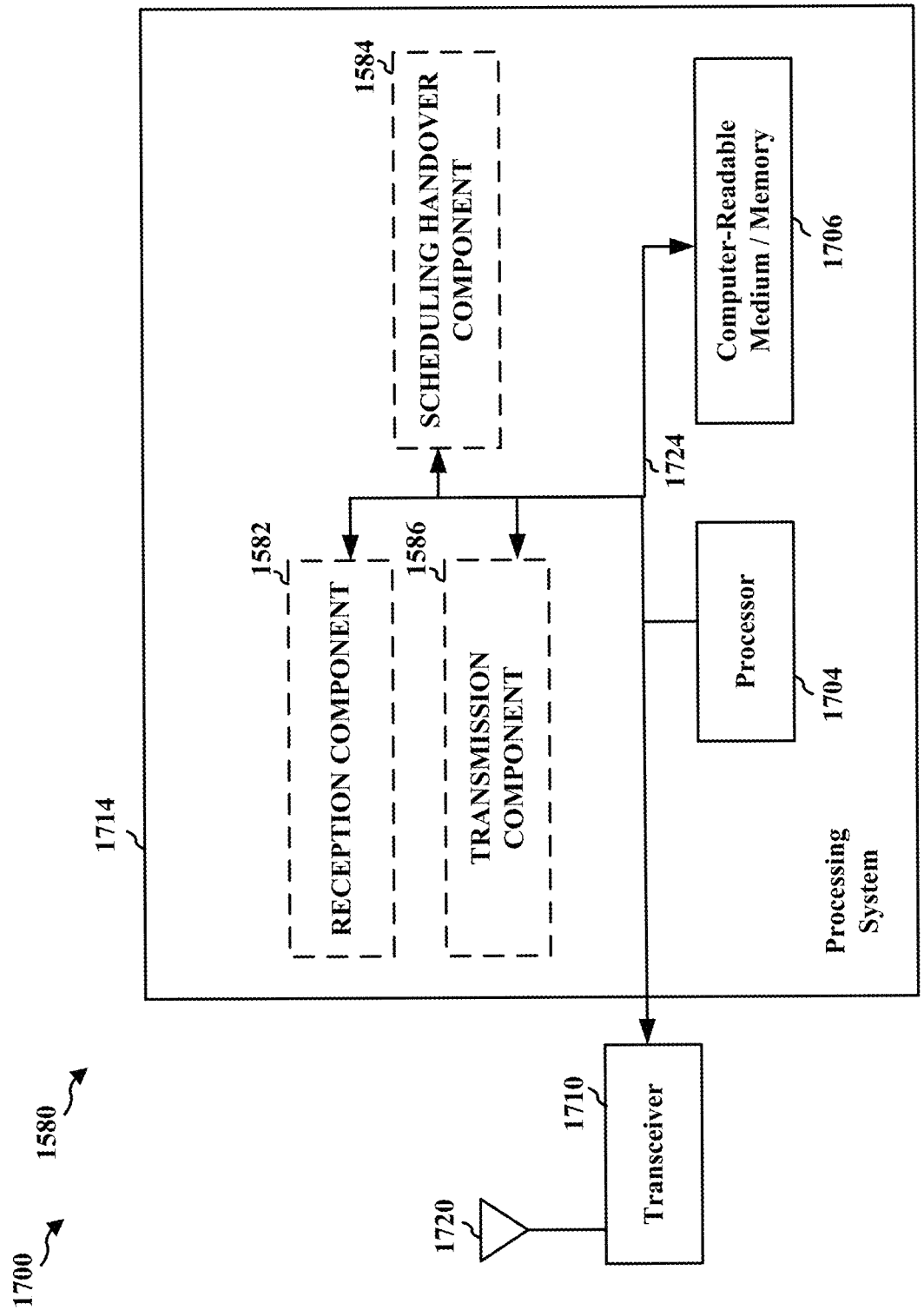
FIG. 17 is a diagram illustrating an example of another hardware implementation for an apparatus employing a processing system, according to various aspects.

FIG. 17 is a diagram 1700 illustrating an example of a hardware implementation for an apparatus 1580 employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 may link together various circuits including one or more processors and/or hardware components, represented by the processor 1704, the components 1582, 1584 and 1586, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710, which in turn may be coupled to one or more antennas 1720. The transceiver 1710 may provide means for communicating with various other apparatus over a transmission medium. The transceiver 1710 may receive a signal from the one or more antennas 1720, extract information from the received signal, and provide the extracted information to the processing system 1714, specifically the reception component 1582. In addition, the transceiver 1710 may receive information from the processing system 1714, specifically the transmission component 1586, and based on the received information, generate a signal to be applied to the one or more antennas 1720. The processing system 1714 may include a processor 1704 coupled to a computer-readable medium/memory 1706. The processor 1704 may be responsible for general processing, including the execution of software stored on the computer-readable medium/memory 1706. The software, when executed by the processor 1704, may cause the processing system 1714 to perform the various functions described supra for any particular apparatus. The computer-readable medium/memory 1706 may also be used for storing data that is manipulated by the processor 1704 when executing software. The processing system 1714 may further include at least one of the components 1582, 1584 and 1586. The components may be software components running in the processor 1704, resident/stored in the computer readable medium/memory 1706, one or more hardware components coupled to the processor 1704, or some combination thereof. The processing system 1714 may be a component of the BS 102, gNB 222, eNB 224, apparatus 304, or apparatus 306. The processing system 1714 may include transceiver 350 (including transmitter 354, receiver 352), transceiver 360 (including transmitter 364, receiver 362), antenna 356, antenna 366, network interface 380, processing system 384, memory 386, and scheduling switch module 388. Alternatively or in addition thereto, the processing system 1714 may include network interface 390, processing system 394, memory 396, and scheduling switch module 389.

In one configuration, the apparatus 1580 (e.g., first network node, second network node) may comprise means for configuring the UE, means for determining dormancy states of cells, means for sending a scheduling switch notification to a user equipment (UE), means for switching the scheduling from the first network node to the one or more second network nodes, and means for switching back to be the scheduling node for the UE.

The aforementioned means may be one or more of the aforementioned components of the apparatus 1580 and/or the processing system 1714 of the apparatus 1580 configured to perform the functions recited by the aforementioned means. The processing system 1714 may include transceiver 310 (including transmitter 314, receiver 312), transceiver 320 (including transmitter 324, receiver 322), antenna 316, antenna 326, processing system 332, memory 340, and scheduling switch module 342.

Implementation examples are described in the following numbered clauses:

Clause 1: A method of a first network node, the method comprising: sending, by the first network node, a scheduling switch notification to a user equipment (UE), the scheduling switch notification indicating that provision of scheduling information for the UE will switch from the first network node to one or more next network nodes in a cell group; and switching, by the first network node, the provision of the scheduling information for the UE from the first network node to the one or more next network nodes, wherein the UE is in connection with the first network node and one or more second network nodes simultaneously, the one or more next network nodes comprising the first network node, at least one second network node, or both, wherein the scheduling information comprises information on communication resources scheduled for the UE to communicate with the first network node, the one or more second network nodes, or both, the communication resources comprising uplink (UL) resources, downlink (DL) resources, or both.

Clause 2: The method of Clause 1, wherein prior to the switch, the first network node has both user and control data connections with the UE and the one or more second network nodes have user data connections with the UE, and wherein the scheduling switch notification indicates that subsequent to the switch, the one or more next network nodes are to have both user and control data connections with the UE and other network nodes are to have user data connections with the UE, the other network nodes comprising one or more network nodes among the first and second network nodes other than the one or more next network nodes.

Clause 3: The method of any of Clauses 1-2, wherein the first network node is a primary cell (Pcell) and the one or more second network nodes are one or more secondary cells (Scell) corresponding to the primary cell.

Clause 4: The method of any of Clauses 1-3, wherein the scheduling switch notification is sent on a wake-up-signal (WUS) occasion of the UE.

Clause 5: The method of Clause 4, wherein sending the scheduling switch notification on the WUS comprises: setting a wakeup indication of the WUS to indicate that the UE need not be activated on a next discontinuous reception (DRX) active time; setting one or more node dormancy indications of the WUS to indicate that the one or more second network nodes are not dormant; and transmitting the WUS to the UE.

Clause 6: The method of Clause 4, wherein sending the scheduling switch notification on the WUS comprises: setting a scheduling switch indication of the WUS; and transmitting the WUS to the UE.

Clause 7: The method of any of Clauses 1-6, wherein the scheduling switch notification includes identity indications of the one or more next network nodes.

Clause 8: The method of Clause 7, wherein each identity indication comprises any one or more of physical cell ID (PCI), NR cell global identifier (NCGI), gNB identifier (gNB ID), and global gNB ID, or wherein each identity indication comprises a system frame number (SFN), a slot number, or both, each next network node being mapped to one or a combination of the SFN and the slot number, or both.

Clause 9: The method of Clause 7, wherein the UE is configured with a scheduling nodes list comprising one or more network nodes that can function as a scheduling node, each network node of the scheduling nodes list being the first network node or one of the second network nodes, and wherein each identity indication maps to a network node of the scheduling nodes list.

Clause 10: The method of any of Clauses 1-9, wherein the UE is configured with a scheduling nodes list comprising one or more network nodes that can function as a scheduling node, each network node of the scheduling nodes list being the first network node or one of the second network nodes, and wherein the one or more next network nodes are chosen from the scheduling nodes list without providing identity indications to the UE.

Clause 11: The method of Clause 10, wherein the one or more next network nodes are chosen from the scheduling nodes list in a round robin fashion, or wherein the nodes in the scheduling nodes list are ordered, and the one or more next network nodes are chosen from the scheduling nodes list based on the ordering, or both.

Clause 12: The method of any of Clauses 1-11, wherein the switching the provision of the scheduling information for the UE from the first network node to the one or more next network nodes occurs at a discontinuous reception (DRX) active time of the UE subsequent to sending the scheduling switch notification, or after a passage of a trigger offset time since sending the scheduling switch notification.

Clause 13: The method of any of Clauses 1-12, wherein the first network node is a default scheduling node, wherein the method further comprises switching back to be the scheduling node for the UE after expiration of a resume-default-inactivity timer or expiration of a result-default timer at the one or more next network nodes, the resume-default-inactivity timer or the result-default timer being started upon switching the scheduling, wherein the resume-default-inactivity timer is a timer that is restarted each time a downlink control indicator (DCI) is sent to the UE by the one or more next network nodes before the expiration thereof, and wherein the resume-default timer is a timer that continues to run regardless of whether or not the DCI is sent to the UE by the one or more next network nodes.

Clause 14: A first network node comprising at least one means for performing a method of any of Clauses 1-13.

Clause 15: A first network node comprising a processor, memory coupled with the processor, the processor and memory configured to perform a method of any of Clauses 1-13.

Clause 16: A non-transitory computer-readable medium storing code for a first network node comprising a processor, memory coupled with the processor, and instructions stored in the memory and executable by the processor to cause the first network node to perform a method of any of Clauses 1-13.

Clause 17: A method of a user equipment (UE), the method comprising: receiving, at the UE, a scheduling switch notification from a first network node, the scheduling switch notification indicating that provision of scheduling information for the UE will switch from the first network node to one or more next network nodes in a cell group; and switching, by the UE, to monitor the one or more next network nodes for the scheduling information in accordance with the scheduling switch notification, wherein the UE is in connection with the first network node and one or more second network nodes simultaneously, the one or more next network nodes comprising the first network node, at least one second network node, or both, wherein the scheduling information comprises information on communication resources scheduled for the UE to communicate with the first network node, the one or more second network nodes, or both, the communication resources comprising uplink (UL) resources, downlink (DL) resources, or both.

Clause 18: The method of Clause 17, wherein prior to the switch, the first network node has both user and control data connections with the UE and the one or more second network nodes have user data connections with the UE, and wherein the scheduling switch notification indicates that subsequent to the switch, the one or more next network nodes are to have both user and control data connections with the UE and other network nodes are to have user data connections with the UE, the other network nodes comprising one or more network nodes among the first and second network nodes other than the one or more next network nodes.

Clause 19: The method of any of Clauses 17-18, wherein the first network node is a primary cell (Pcell) and the one or more second network nodes are one or more secondary cells (Scell) corresponding to the primary cell.

Clause 20: The method of any of Clauses 17-19, wherein the scheduling switch notification is sent on a wake-up-signal (WUS) occasion of the UE.

Clause 21: The method of Clause 20, wherein the UE determines that it has received the scheduling switch notification on the WUS occasion when a wakeup indication of the WUS indicates that the UE need not be activated on the a discontinuous reception (DRX) active time, and one or more node dormancy indications of the WUS indicate that one or more second network nodes are not dormant.

Clause 22: The method of Clause 20, wherein the UE determines that it has received the scheduling switch notification on the WUS occasion when a scheduling switch indication of the WUS is set.

Clause 23: The method of any of Clauses 17-22, wherein the scheduling switch notification includes identity indications of the one or more next network nodes.

Clause 24: The method of Clause 23, wherein each identity indication comprises any one or more of physical cell ID (PCI), NR cell global identifier (NCGI), gNB identifier (gNB ID), and global gNB ID, or wherein each identity indication comprises a system frame number (SFN), a slot number, or both, each next network node being mapped to one or a combination of the SFN and the slot number, or both.

Clause 25: The method of Clause 23, wherein the UE is configured with a scheduling nodes list comprising one or more network nodes that can function as a scheduling node, each network node of the scheduling nodes list being the first network node or one of the second network nodes, and wherein each identity indication maps to a network node of the scheduling nodes list.

Clause 26: The method of any of Clauses 17-25, wherein the UE is configured with a scheduling nodes list comprising one or more network nodes that can function as a scheduling node, each network node of the scheduling nodes list being the first network node or one of the second network nodes, and wherein the one or more next network nodes are chosen from the scheduling nodes list without receiving identity indications from the first network node.

Clause 27: The method of Clause 26, wherein the one or more next network nodes are chosen from the scheduling nodes list in a round robin fashion, or wherein the nodes in the scheduling nodes list are ordered, and the one or more next network nodes are chosen from the scheduling nodes list based on the ordering, or both.

Clause 28: The method of any of Clauses 17-27, wherein the UE switches to monitor the one or more next network nodes at a discontinuous reception (DRX) active time of the UE subsequent to receiving the scheduling switch notification, or after a passage of a trigger offset time since receiving the scheduling switch notification.

Clause 29: The method of any of Clauses 17-28, further comprising: switching to monitor a default scheduling node for scheduling information after expiration of a resume-default-inactivity timer or expiration of a result-default timer at the one or more next network nodes, the resume-default-inactivity timer or the result-default timer being started upon switching the scheduling, wherein the resume-default-inactivity timer is a timer that is restarted each time a downlink control indicator (DCI) is sent to the UE by the one or more next network nodes before the expiration thereof, and wherein the resume-default timer is a timer that continues to run regardless of whether or not the DCI is sent to the UE by the one or more next network nodes.

Clause 30: A user equipment (UE) comprising at least one means for performing a method of any of Clauses 17-29.

Clause 31: A user equipment (UE) comprising a processor, memory coupled with the processor, the processor and memory configured to perform a method of any of Clauses 17-29.

Clause 32: A non-transitory computer-readable medium storing code for a user equipment (UE) comprising a processor, memory coupled with the processor, and instructions stored in the memory and executable by the processor to cause the UE to perform a method of any of Clauses 17-29.

Clause 33: A method of performing a scheduling switch, the method comprising: sending, from a current scheduling cell, a scheduling handover notification to a user equipment (UE), the scheduling switch notification indicating that scheduling of uplink (UL) and/or downlink (DL) resources for the UE will switch from the current scheduling cell to one or more second network nodes; and switching the scheduling from the current scheduling cell to the one or more second network nodes, wherein the current scheduling cell is a primary cell or one of one or more secondary cells for the UE, and each second network node is the primary cell or one of the one or more secondary cells for the UE.

Clause 34: The method of Clause 33, wherein the scheduling handover notification is sent on a wake-up-signal (WUS) occasion of the UE.

Clause 35: The method of Clause 34, wherein the UE is configured to set a scheduling-handover flag, and wherein sending the scheduling handover notification using the WUS comprises: setting a wakeup indication of the WUS to indicate that the UE need not be activated on the next discontinuous reception (DRX) active time; setting one or more SCell dormancy indications of the WUS to indicate that one or more SCells are not dormant; and transmitting the WUS to the UE.

Clause 36: The method of Clause 35, wherein a radio resource control (RRC) message is used to configure the UE to set the scheduling-handover flag.

Clause 37: The method of Clause 34, wherein sending the scheduling handover notification using the WUS comprises: setting a scheduling-handover indication of the WUS; and transmitting the WUS to the UE.

Clause 38: The method of Clause 33, wherein the scheduling handover notification is sent on a downlink control indicator (DCI), and/or a MAC control element (CE).

Clause 39: The method of any of Clauses 33-38, wherein the scheduling handover notification includes identity indications of the one or more next scheduling cells.

Clause 40: The method of Clause 39, wherein each identity indication comprises any one or more of physical cell ID (PCI), NR cell global identifier (NCGI), gNB identifier (gNB ID), and global gNB ID.

Clause 41: The method of any of Clauses 39-40, wherein each identity indication comprises a system frame number (SFN) and/or a slot number, each next scheduling cell being mapped to one or a combination of the SFN and the slot number.

Clause 42: The method of any of Clauses 39-41, wherein the UE is configured with a scheduling cells list comprising one or more cells that can function as a scheduling cell, each cell of the scheduling cells list being the primary cell or one of the secondary cells, and wherein each identity indication maps to a cell of the scheduling cells list.

Clause 43: The method of Clause 42, wherein a radio resource control (RRC) message is used to configure the UE with the scheduling cells list.

Clause 44: The method of any of Clauses 33-38, wherein the UE is configured with a scheduling cells list comprising one or more cells that can function as a scheduling cell, each cell of the scheduling cells list being the primary cell or one of the secondary cells, and wherein the one or more next cells are chosen from the scheduling cells list without providing identity indications to the UE.

Clause 45: The method of Clause 44, wherein cells in the scheduling cells list are ordered, and wherein the one or more next cells are chosen from the scheduling cells list based on the ordering.

Clause 46: The method of Clause 44, wherein the one or more next cells are chosen from the scheduling cells list in a round robin fashion.

Clause 47: The method of any of Clauses 44-46, wherein a radio resource control (RRC) message is used to configure the UE with the scheduling cells list.

Clause 48: The method of any of Clauses 33-47, wherein the handover of the scheduling from the current scheduling cell to the one or more next cells occurs at a discontinuous reception (DRX) active time of the UE subsequent to sending the scheduling handover notification.

Clause 49: The method of any of Clauses 33-47, wherein the handover of the scheduling from the current scheduling cell to the one or more next scheduling cells occurs after a passage of a trigger offset time since sending the scheduling handover notification.

Clause 50: The method of Clause 49, wherein the trigger offset time is set within the UE and/or is configured in the UE with RRC configuration message from the current scheduling cell and/or is provided in the scheduling handover notification.

Clause 51: The method of any of Clauses 33-50, wherein the current scheduling cell is a default cell, wherein the method further comprises switching back to be the scheduling cell for the UE after expiration of a resume-default-inactivity timer or expiration of a result-default timer at the one or more next scheduling cells, the resume-default-inactivity timer or the result-default timer being started upon handing over the scheduling, wherein the resume-default-inactivity timer is a timer that is restarted each time a downlink control indicator (DCI) is sent to the UE by the one or more next scheduling cells before the expiration thereof, and wherein the resume-default timer is a timer that continues to run regardless of whether or not the DCI is sent to the UE by the one or more next scheduling cells.

Clause 52: A current scheduling cell comprising at least one means for performing a method of any of Clauses 33-51.

Clause 53: A current scheduling cell comprising a processor, memory coupled with the processor, the processor and memory configured to perform a method of any of Clauses 33-51.

Clause 54: A non-transitory computer-readable medium storing code for a current scheduling cell comprising a processor, memory coupled with the processor, and instructions stored in the memory and executable by the processor to cause the current scheduling cell to perform a method of any of Clauses 33-51.

Clause 55: A method of scheduling switch, the method comprising: receiving, at a user equipment (UE), a scheduling switch notification from a current scheduling cell, the scheduling switch notification indicating that scheduling of uplink (UL) and/or downlink (DL) resources for the UE will switch from the current scheduling cell to one or more second network nodes; and switching, by the UE, to monitor the one or more second network nodes for scheduling of the UL and/or DL resources in accordance with the scheduling switch notification, wherein the current scheduling cell is a primary cell or one of one or more secondary cells for the UE, and each second network node is the primary cell or one of the one or more secondary cells for the UE.

Clause 56: The method of Clause 55, wherein the scheduling handover notification is received on a wake-up-signal (WUS) occasion of the UE.

Clause 57: The method of Clause 56, wherein the UE determines that it has received the scheduling handover notification on the WUS occasion when a scheduling-handover flag is set, a wakeup indication of the WUS indicates that the UE need not be activated on the next discontinuous reception (DRX) active time, one or more SCell dormancy indications of the WUS indicate that one or more SCells are not dormant.

Clause 58: The method of Clause 57, wherein the scheduling-handover flag is set through a radio resource control (RRC) message received from the current scheduling cell.

Clause 59: The method of Clause 56, wherein the UE determines that it has received the scheduling handover notification on the WUS occasion when a scheduling-handover indication of the WUS is set.

Clause 60: The method of Clause 55, wherein the scheduling handover notification is received on a downlink control indicator (DCI), and/or a MAC control element (CE).

Clause 61: The method of any of Clauses 55-60, wherein the scheduling handover notification includes identity indications of the one or more next scheduling cells.

Clause 62: The method of Clause 61, wherein each identity indication comprises any one or more of physical cell ID (PCI), NR cell global identifier (NCGI), gNB identifier (gNB ID), and global gNB ID.

Clause 63: The method of any of Clauses 61-62, wherein each identity indication comprises a system frame number (SFN) and/or a slot number, each next scheduling cell being mapped to one or a combination of the SFN and the slot number.

Clause 64: The method of any of Clauses 61-63, wherein the UE is configured with a scheduling cells list comprising one or more cells that can function as a scheduling cell, each cell of the scheduling cells list being the primary cell or one of the secondary cells, and wherein each identity indication maps to a cell of the scheduling cells list.

Clause 65: The method of Clause 64, wherein the scheduling cells list is set through a radio resource control (RRC) message received from the current scheduling cell.

Clause 66: The method of any of Clauses 55-60, wherein the UE is configured with a scheduling cells list comprising one or more cells that can function as a scheduling cell, each cell of the scheduling cells list being the primary cell or one of the secondary cells, and wherein the UE chooses the one or more next scheduling cells from the scheduling cells list without receiving any identity indications from the current scheduling cell.

Clause 67: The method of Clause 66, wherein cells in the scheduling cells list are ordered, and wherein the UE chooses the one or more next scheduling cells from the scheduling cells list based on the ordering.

Clause 68: The method of Clause 66, wherein the UE chooses the one or more next scheduling cells from the scheduling cells list in a round robin fashion.

Clause 69: The method of any of Clauses 66-68, wherein the scheduling cells list is set through a radio resource control (RRC) message received from the current scheduling cell.

Clause 70: The method of any of Clauses 55-69, wherein the UE switches to monitor the one or more next scheduling cells at a discontinuous reception (DRX) active time of the UE subsequent to receiving the scheduling handover notification.

Clause 71: wherein the scheduling handover notification is received on a wake-up-signal (WUS) occasion of the UE.

Clause 72: The method of any of Clauses 55-69, wherein the switching to monitor the one or more next scheduling cells occurs after a passage of a trigger offset time since receiving the scheduling handover notification.

Clause 73: The method of Clause 71, wherein the trigger offset time is set within the UE and/or is configured in the UE with RRC configuration message from the current scheduling cell and/or is provided in the scheduling handover notification.

Clause 74: The method of any of Clauses 55-72, further comprising: switching to monitor a default scheduling cell for scheduling of the UL and/or DL resources.

Clause 75: The method of Clause 74, wherein switching to monitor the default scheduling cell comprises: starting a resume-default timer subsequent to monitoring the one or more next scheduling cells; and switching to monitor the default cell for the scheduling of the UL and/or DL resources when the resume-default timer expires.

Clause 76: The method of Clause 74, wherein switching to monitor the default scheduling cell comprises: starting a resume-default inactivity timer subsequent to monitoring the one or more next scheduling cells; restarting the resume-default inactivity timer each time a downlink control information (DCI) is received from the one or more next scheduling cells; and switching to monitor the default cell for the scheduling of the UL and/or DL resources when the resume-default inactivity timer expires before the DCI is received from the one or more next scheduling cells.

Clause 77: A user equipment comprising at least one means for performing a method of any of Clauses 55-76.

Clause 78: A user equipment comprising a processor, memory coupled with the processor, the processor and memory configured to perform a method of any of Clauses 55-76.

Clause 79: A non-transitory computer-readable medium storing code for a user equipment comprising a processor, memory coupled with the processor, and instructions stored in the memory and executable by the processor to cause the user equipment to perform a method of any of Clauses 55-76.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

Additional details that relate to the aspects described herein are described and illustrated in an Appendix attached hereto, the contents of which are expressly incorporated herein by reference in their entirety as part of this disclosure.

What is claimed is:

1. A first network node, comprising:
one or more memories;
one or more transceivers; and
one or more processors communicatively coupled to the one or more memories and the one or more transceivers, the one or more processors configured to:
send a scheduling switch notification to a user equipment (UE), the scheduling switch notification indicating that provision of scheduling information for the UE will switch from the first network node to one or more next network nodes in a cell group; and
switch the provision of the scheduling information for the UE from the first network node to the one or more next network nodes, wherein the UE is in connection with the first network node and one or more second network nodes simultaneously, the one or more next network nodes comprising the first network node, at least one second network node, or both, wherein the scheduling information comprises information on communication resources scheduled for the UE to communicate with the first network node, the one or more second network nodes, or both, the communication resources comprising uplink (UL) resources, downlink (DL) resources, or both, wherein the first network node is a cross-carrier scheduler for the UE before the switch, and the at least one second network node is the cross-carrier scheduler for the UE after the switch, the cross-carrier scheduler being a network node configured to schedule resources of one or more other network nodes, wherein the first network node is a default scheduling node, wherein the one or more processors are further configured to switch back to be the scheduling node for the UE after expiration of a resume-default-inactivity timer or expiration of a resume-default timer at the one or more next network nodes, the resume-default-inactivity timer or the resume-default timer being started upon switching the scheduling, wherein the resume-default-inactivity timer is a timer that is restarted each time a downlink control indicator (DCI) is sent to the UE by the one or more next network nodes before the expiration thereof, and wherein the resume-default timer is a timer that continues to run regardless of whether or not the DCI is sent to the UE by the one or more next network nodes.

2. The first network node of claim 1,
wherein prior to the switch, the first network node has both user and control data connections with the UE and the one or more second network nodes have user data connections with the UE, and
wherein the scheduling switch notification indicates that subsequent to the switch, the one or more next network nodes are to have both user and control data connections with the UE and other network nodes are to have user data connections with the UE, the other network nodes comprising one or more network nodes among the first and the one or more second network nodes other than the one or more next network nodes.

3. The first network node of claim 1, wherein the first network node is a primary cell (Pcell) and the one or more second network nodes are one or more secondary cells (Scell) corresponding to the primary cell.

4. The first network node of claim 1, wherein the one or more processors are configured to send the scheduling switch notification on a wake-up-signal (WUS) occasion of the UE.

5. The first network node of claim 4, wherein in sending the scheduling switch notification on the WUS, the one or more processors are configured to:
set a wakeup indication of the WUS to indicate that the UE need not be activated on a next discontinuous reception (DRX) active time;
set one or more node dormancy indications of the WUS to indicate that the one or more second network nodes are not dormant; and
transmit the WUS to the UE.

6. The first network node of claim 1, wherein the scheduling the switch notification includes identity indications of the one or more next network nodes.

7. The first network node of claim 6,
wherein each identity indication comprises any one or more of physical cell ID (PCI), NR cell global identifier (NCGI), gNB identifier (gNB ID), and global gNB ID, or
wherein each identity indication comprises a system frame number (SFN), a slot number, or both, each next network node being mapped to one or a combination of the SFN and the slot number, or
both.

8. The first network node of claim 6,
wherein the UE is configured with a scheduling nodes list comprising one or more network nodes that can function as a scheduling node, each network node of the scheduling nodes list being the first network node or one of the one or more second network nodes, and
wherein each identity indication maps to a network node of the scheduling nodes list.

9. The first network node of claim 1,
wherein the UE is configured with a scheduling nodes list comprising one or more network nodes that can function as a scheduling node, each network node of the scheduling nodes list being the first network node or one of the one or more second network nodes,
wherein the one or more next network nodes are chosen from the scheduling nodes list in a round robin fashion, or
wherein the nodes in the scheduling nodes list are ordered, and the one or more next network nodes are chosen from the scheduling nodes list based on the ordering, or
both.

10. The first network node of claim 1, wherein the switching the provision of the scheduling information for the UE from the first network node to the one or more next network nodes occurs
at a discontinuous reception (DRX) active time of the UE subsequent to sending the scheduling switch notification, or
after a passage of a trigger offset time since sending the scheduling switch notification.

11. A user equipment (UE), comprising:
one or more memories;
one or more transceivers; and
one or more processors communicatively coupled to the one or more memories and the one or more transceivers, the one or more processors configured to:
receive a scheduling switch notification from a first network node, the scheduling switch notification indicating that provision of scheduling information for the UE will switch from the first network node to one or more next network nodes in a cell group; and
switch to monitor the one or more next network nodes for the scheduling information in accordance with the scheduling switch notification,
wherein the UE is in connection with the first network node and one or more second network nodes simultaneously, the one or more next network nodes comprising the first network node, at least one second network node, or both,
wherein the scheduling information comprises information on communication resources scheduled for the UE to communicate with the first network node, the one or more second network nodes, or both, the communication resources comprising uplink (UL) resources, downlink (DL) resources, or both,
wherein the first network node is a cross-carrier scheduler for the UE before the switch, and the at least one second network node is the cross-carrier scheduler for the UE after the switch, the cross-carrier scheduler being a network node configured to schedule resources of one or more other network nodes, wherein the one or more processors are further configured to switch to monitor a default scheduling node for scheduling information after expiration of a resume-default-inactivity timer or expiration of a resume-default timer at the one or more next network nodes, the resume-default-inactivity timer or the resume-default timer being started upon switching the scheduling, wherein the resume-default-inactivity timer is a timer that is restarted each time a downlink control indicator (DCI) is sent to the UE by the one or more next network nodes before the expiration thereof, and wherein the resume-default timer is a timer that continues to run regardless of whether or not the DCI is sent to the UE by the one or more next network nodes.

12. The UE of claim 11,
wherein prior to the switch, the first network node has both user and control data connections with the UE and the one or more second network nodes have user data connections with the UE, and
wherein the scheduling switch notification indicates that subsequent to the switch, the one or more next network nodes are to have both user and control data connections with the UE and other network nodes are to have user data connections with the UE, the other network nodes comprising one or more network nodes among the first and the one or more second network nodes other than the one or more next network nodes.

13. The UE of claim 11, wherein the first network node is a primary cell (Pcell) and the one or more second network nodes are one or more secondary cells (Scell) corresponding to the primary cell.

14. The UE of claim 11, wherein the one or more processors are configured to receive the scheduling switch notification on a wake-up-signal (WUS) occasion of the UE.

15. The UE of claim 14, wherein the one or more processors are configured to determine that the scheduling switch notification has been received on the WUS occasion when
a wakeup indication of the WUS indicates that the UE need not be activated on a next discontinuous reception (DRX) active time, and
one or more node dormancy indications of the WUS indicate that one or more second network nodes are not dormant.

16. The UE of claim 11, wherein the scheduling switch notification includes identity indications of the one or more next network nodes.

17. The UE of claim 16,
wherein each identity indication comprises any one or more of physical cell ID (PCI), NR cell global identifier (NCGI), gNB identifier (gNB ID), and global gNB ID, or
wherein each identity indication comprises a system frame number (SFN), a slot number, or both, each next network node being mapped to one or a combination of the SFN and the slot number, or
both.

18. The UE of claim 16,
wherein the UE is configured with a scheduling nodes list comprising one or more network nodes that can function as a scheduling node, each network node of the scheduling nodes list being the first network node or one of the one or more second network nodes, and wherein each identity indication maps to a network node of the scheduling nodes list.

19. The UE of claim 11,
wherein the UE is configured with a scheduling nodes list comprising one or more network nodes that can function as a scheduling node, each network node of the scheduling nodes list being the first network node or one of the one or more second network nodes,
wherein the one or more next network nodes are chosen from the scheduling nodes list in a round robin fashion, or
wherein the nodes in the scheduling nodes list are ordered, and the one or more next network nodes are chosen from the scheduling nodes list based on the ordering, or both.

20. The UE of claim 11, wherein the one or more processors are configured to switch to monitor the one or more next network nodes
at a discontinuous reception (DRX) active time of the UE subsequent to receiving the scheduling switch notification, or
after a passage of a trigger offset time since receiving the scheduling switch notification.

21. A method of a first network node, the method comprising:
sending, by the first network node, a scheduling switch notification to a user equipment (UE), the scheduling switch notification indicating that provision of scheduling information for the UE will switch from the first network node to one or more next network nodes in a cell group; and
switching, by the first network node, the provision of the scheduling information for the UE from the first network node to the one or more next network nodes,
wherein the UE is in connection with the first network node and one or more second network nodes simultaneously, the one or more next network nodes comprising the first network node, at least one second network node, or both,
wherein the scheduling information comprises information on communication resources scheduled for the UE to communicate with the first network node, the one or more second network nodes, or both, the communication resources comprising uplink (UL) resources, downlink (DL) resources, or both,
wherein the first network node is a cross-carrier scheduler for the UE before the switch, and the at least one second network node is the cross-carrier scheduler for the UE after the switch, the cross-carrier scheduler being a network node configured to schedule resources of one or more other network nodes,
wherein the first network node is a default scheduling node,
wherein the method further comprises switching back to be the scheduling node for the UE after expiration of a resume-default-inactivity timer or expiration of a resume-default timer at the one or more next network nodes, the resume-default-inactivity timer or the resume-default timer being started upon switching the scheduling,
wherein the resume-default-inactivity timer is a timer that is restarted each time a downlink control indicator (DCI) is sent to the UE by the one or more next network nodes before the expiration thereof, and
wherein the resume-default timer is a timer that continues to run regardless of whether or not the DCI is sent to the UE by the one or more next network nodes.

22. The method of claim 21,
wherein prior to the switch, the first network node has both user and control data connections with the UE and the one or more second network nodes have user data connections with the UE, and
wherein the scheduling switch notification indicates that subsequent to the switch, the one or more next network nodes are to have both user and control data connections with the UE and other network nodes are to have user data connections with the UE, the other network nodes comprising one or more network nodes among the first and the one or more second network nodes other than the one or more next network nodes.

23. The method of claim 21, wherein the scheduling switch notification is sent on a wake-up-signal (WUS) occasion of the UE.

24. The method claim 21,
wherein the UE is configured with a scheduling nodes list comprising one or more network nodes that can function as a scheduling node, each network node of the scheduling nodes list being the first network node or one of the one or more second network nodes, and
wherein the one or more next network nodes are chosen from the scheduling nodes list without providing identity indications to the UE.

25. The method of claim 21, wherein the first network node is a primary cell for the UE and the one or more second network nodes are secondary cells for the UE.

26. A method of a user equipment (UE), the method comprising:
receiving, at the UE, a scheduling switch notification from a first network node, the scheduling switch notification indicating that provision of scheduling information for the UE will switch from the first network node to one or more next network nodes in a cell group; and
switching, by the UE, to monitor the one or more next network nodes for the scheduling information in accordance with the scheduling switch notification,
wherein the UE is in connection with the first network node and one or more second network nodes simultaneously, the one or more next network nodes comprising the first network node, at least one second network node, or both,
wherein the scheduling information comprises information on communication resources scheduled for the UE to communicate with the first network node, the one or more second network nodes, or both, the communication resources comprising uplink (UL) resources, downlink (DL) resources, or both,
wherein the first network node is a cross-carrier scheduler for the UE before the switch, and the at least one second network node is the cross-carrier scheduler for the UE after the switch, the cross-carrier scheduler being a network node configured to schedule resources of one or more other network nodes,
wherein the method further comprises switching to monitor a default scheduling node for scheduling information after expiration of a resume-default-inactivity timer or expiration of a resume-default timer at the one or more next network nodes, the resume-default-inactivity timer or the resume-default timer being started upon switching the scheduling,
wherein the resume-default-inactivity timer is a timer that is restarted each time a downlink control indicator (DCI) is sent to the UE by the one or more next network nodes before the expiration thereof, and
wherein the resume-default timer is a timer that continues to run regardless of whether or not the DCI is sent to the UE by the one or more next network nodes.

27. The method of claim 26,
wherein prior to the switch, the first network node has both user and control data connections with the UE and the one or more second network nodes have user data connections with the UE, and
wherein the scheduling switch notification indicates that subsequent to the switch, the one or more next network nodes are to have both user and control data connections with the UE and other network nodes are to have user data connections with the UE, the other network nodes comprising one or more network nodes among the first and the one or more second network nodes other than the one or more next network nodes.

28. The UE of claim 26, wherein the scheduling switch notification is received on a wake-up-signal (WUS) occasion of the UE.

29. The method of claim 26,
wherein the UE is configured with a scheduling nodes list comprising one or more network nodes that can function as a scheduling node, each network node of the scheduling nodes list being the first network node or one of the one or more second network nodes, and
wherein the one or more next network nodes are chosen from the scheduling nodes list without receiving identity indications from the first network node.

30. The method of claim 26, wherein the first network node is a primary cell for the UE and the one or more second network nodes are secondary cells for the UE.

* * * * *